United States Patent
Phan et al.

(10) Patent No.: US 11,216,743 B2
(45) Date of Patent: Jan. 4, 2022

(54) LEARNING SPARSITY-CONSTRAINED GAUSSIAN GRAPHICAL MODELS IN ANOMALY DETECTION

(71) Applicant: International Business Machines Corporation, Armonk, NY (US)

(72) Inventors: Dzung Phan, Ossining, NY (US); Matthew Menickelly, Downers Grove, IL (US); Jayant R. Kalagnanam, Briarcliff Manor, NY (US); Tsuyoshi Ide, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 16/103,220

(22) Filed: Aug. 14, 2018

(65) Prior Publication Data
US 2020/0057956 A1   Feb. 20, 2020

(51) Int. Cl.
*G06N 7/02* (2006.01)
*G06F 11/30* (2006.01)
*G06N 5/00* (2006.01)
*G06N 20/00* (2019.01)
*G06F 16/901* (2019.01)

(52) U.S. Cl.
CPC .......... *G06N 7/02* (2013.01); *G06F 11/3006* (2013.01); *G06F 11/3089* (2013.01); *G06F 16/9024* (2019.01); *G06N 5/003* (2013.01); *G06N 20/00* (2019.01)

(58) Field of Classification Search
None
See application file for complete search history.

(56) References Cited

U.S. PATENT DOCUMENTS

| | | |
|---|---|---|
| 9,477,929 B2 | 10/2016 | He et al. |
| 9,483,049 B2 | 11/2016 | Maeda et al. |

(Continued)

OTHER PUBLICATIONS

Alippi et al., Learning Causal Dependencies to Detect and Diagnose Faults in Sensor Networks, IEEE, 2014, Total pp. 8 (Year: 2014).*

(Continued)

*Primary Examiner* — Alan Chen
(74) *Attorney, Agent, or Firm* — Scully, Scott, Murphy & Presser, P.C.; Daniel P. Morris

(57) ABSTRACT

A first dependency graph is constructed based on a first data set by solving an objective function constrained with a maximum number of non-zeros and formulated with a regularization term comprising a quadratic penalty to control sparsity. The quadratic penalty in constructing the second dependency graph is determined as a function of the first data set. A second dependency graph is constructed based on a second data set by solving the objective function constrained with the maximum number of non-zeros and formulated with the regularization term comprising a quadratic penalty. The quadratic penalty in constructing the second dependency graph is determined as a function of the first data set and the second data set. An anomaly score is determined for each of a plurality of sensors based on comparing the first dependency graph and the second dependency graph, nodes of which represent sensors.

20 Claims, 5 Drawing Sheets

(56) References Cited

U.S. PATENT DOCUMENTS

2015/0235143 A1 8/2015 Eder
2018/0033017 A1 2/2018 Gopalakrishnan Iyer

OTHER PUBLICATIONS

He et al., A Dependency Graph Approach for Fault Detection and Localization Towards Secure Smart Grid, IEEE Transactions on Smart Grid, vol. 2, No. 2, Jun. 2011, pp. 342-351 (Year: 2011).*

Liu, C., et al., "An unsupervised spatiotemporal graphical modeling approach to anomaly detection in distributed CPS," ICCPS '16 Proceedings of the 7th International Conference on Cyber-Physical Systems, Apr. 2016, 10 pages, Article No. 1.

Chakrabarti, A., et al., "Robust Anomaly Detection for Large-Scale Sensor Data," BuildSys '16 Proceedings of the 3rd ACM International Conference on Systems for Energy-Efficient Built Environments, Nov. 16-14, 2016, pp. 31-40.

Phan, D., et al., "A Novel 10-constrained Gaussian Graphical Model for Anomaly Localization", 2017 IEEE International Conference on Data Mining Workshops (ICDMW), New Orleans, Louisiana, USA, Nov. 2017, pp. 830-833, (Grace Period Disclosure).

Friedman, J., et al., "Sparse inverse covariance estimation with the graphical lasso", Biostatistics (2007), Biostatistics Advance Access, Dec. 12, 2007, pp. 1-10.

Scheinberg, K., et al., "SINO—a greedy coordinate ascent method for sparse inverse covariance selection problem", http://www.optimization-online.org/DB_FILE///2009/07/2359.pdf, Jul. 31, 2009, 21 pages.

Hsieh, C.-J., et al., "QUIC: Quadratic Approximation for Sparse Inverse Covariance Estimation", Journal of Machine Learning Research (2014), Submitted Apr. 13, 2014, Revised Apr. 14, 2014, Published Oct. 14, 2014, pp. 2911-2947, vol. 15.

Scheinberg, K., et al., "Practical Inexact Proximal Quasi-Newton Method with Global Complexity Analysis", https://arxiv.org/pdf/1311.6547v4.pdf, Jul. 15, 2015, pp. 1-29.

Olsen, P.A., et al., "Newton-Like Methods for Sparse Inverse Covariance Estimation", http://papers.nips.cc/paper/4601-newton-like-methods-for-sparse-inverse-covariance-estimation.pdf, Accessed on Aug. 14, 2018, pp. 1-9.

Lu, Z., et al., "Sparse Approximation via Penalty Decomposition Methods", Siam J. Optim., Submitted Sep. 9, 2010, Accepted Sep. 3, 2013, Published online Dec. 5, 2013, pp. 2448-2478, vol. 23, No. 4.

Ide, T., et al., "Proximity-Based Anomaly Detection using Sparse Structure Learning", Proceedings of the 2009 SIAM International Conference on Data Mining, Apr. 30-May 2, 2009, pp. 97-108.

* cited by examiner

FIG. 4

LEARNING SPARSITY-CONSTRAINED GAUSSIAN GRAPHICAL MODELS IN ANOMALY DETECTION

STATEMENT REGARDING PRIOR DISCLOSURES BY THE INVENTOR OR A JOINT INVENTOR

The following disclosure is submitted under 35 U.S.C. 102(b)(1)(A):
D. T. Phan, T. Ide, J. Kalagnanam, M. Menickelly and K. Scheinberg, "A Novel l0-Constrained Gaussian Graphical Model for Anomaly Localization," 2017 IEEE International Conference on Data Mining Workshops (ICDMW), New Orleans, La., USA, November 2017, pp. 830-833.

BACKGROUND

The present disclosure relates to computer-implemented anomaly detection and learning of dependency graphs via which anomalies are detected, for example, in industries such as manufacturing and heavy industries.

In industrial or manufacturing processes, or other like processes, a network of sensors is deployed to enable automatic monitoring of various operating conditions. Data mining techniques, for example, can convert low-level sensor data collected from Internet-of-Things (IoT) devices into actionable insights, for example, for condition-based maintenance. For instance, identifying an unusual occurrence or change in data can signal anomaly.

In traditional problem settings, a goal of anomaly detection is to compute or determine the degree of anomalousness for a multivariate measurement, giving an overall anomaly score. In sensor networks, for example, wireless sensor networks, it may be inadequate simply to indicate whether or not a network is behaving anomalously, for example, to perform anomaly detection. For example, if a sensor network takes measurements from different car parts of a prototype automobile on a test track, then it may be also valuable to the field engineers to know which car parts are contributing to an anomalous behavior, for example, in addition to knowing that the car as a whole is behaving anomalously. Similar problem settings can be found across different application domains, e.g., monitoring mechanical stresses in buildings and bridges, identifying the sources of flooding, and finding sources of threats in computer networks.

BRIEF SUMMARY

A method and system, for example, which detects anomaly in sensor networks, may be provided. The method, in one aspect, may include receiving a first data set comprising sensor data detected by a plurality of sensors coupled to equipments in operation during a first period of time. The method may also include constructing a first dependency graph based on the first data set by solving a first objective function constrained with a maximum number of non-zeros and formulated with a regularization term comprising a quadratic penalty to control sparsity, wherein the quadratic penalty is determined as a function of the first data set in constructing the first dependency graph. The method may further include receiving a second data set comprising sensor data detected by the plurality of sensors coupled to the equipments in operation during a second period of time. The method may also include constructing a second dependency graph based on the second data set by solving the first objective function constrained with the maximum number of non-zeros and formulated with the regularization term comprising a quadratic penalty, wherein the quadratic penalty is determined as a function of the first data set and the second data set in constructing the second dependency graph. The method may also include determining an anomaly score for each of the plurality of sensors based on comparing the first dependency graph and the second dependency graph. In a further aspect, the method may also include, responsive to determining that an anomaly score associated with a sensor in the plurality of sensors meets a threshold value indicative of abnormal functioning, automatically performing a corrective action to correct equipment coupled to the sensor.

A system, in one aspect, may include a hardware processor coupled with a communication interface and a memory device coupled to the hardware processor. The hardware processor may be operable to receive via the communication interface, a first data set comprising sensor data detected by a plurality of sensors coupled to equipments in operation during a first period of time. The hardware processor may be further operable to construct a first dependency graph based on the first data set by solving a first objective function constrained with a maximum number of non-zeros and formulated with a regularization term comprising a quadratic penalty to control sparsity, wherein the quadratic penalty is determined as a function of the first data set in constructing the first dependency graph. The hardware processor may be further operable to receive a second data set comprising sensor data detected by the plurality of sensors coupled to the equipments in operation during a second period of time. The hardware processor may be further operable to construct a second dependency graph based on the second data set by solving the first objective function constrained with the maximum number of non-zeros and formulated with the regularization term comprising a quadratic penalty, wherein the quadratic penalty is determined as a function of the first data set and the second data set in constructing the second dependency graph. The hardware processor may be further operable to determine an anomaly score for each of the plurality of sensors based on comparing the first dependency graph and the second dependency graph. In a further aspect, the hardware processor may be further operable to, responsive to determining that an anomaly score associated with a sensor in the plurality of sensors meets a threshold value indicative of abnormal functioning, automatically perform a corrective action to correct equipment coupled to the sensor.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 is a diagram illustrating a screen display of an analytics tool in an embodiment, which integrate anomaly detection technique in one embodiment.

DETAILED DESCRIPTION

Figure 1:
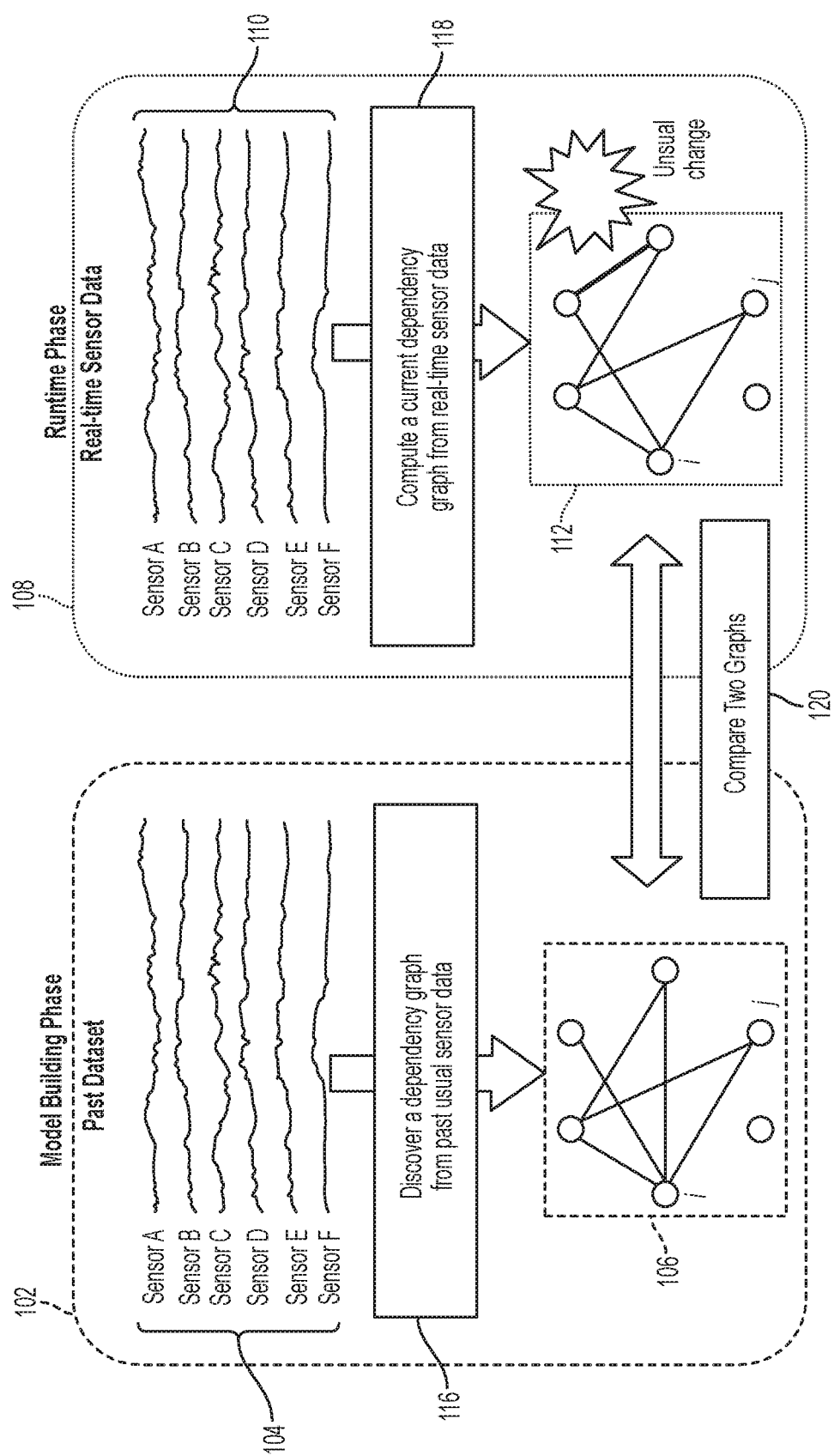
FIG. 1 is a diagram illustrating anomaly detection for multivariate noisy sensor data in one embodiment.

In embodiments, methods, systems and techniques are provided, which detect anomalies in sensor networks. In embodiments, methods, systems and techniques may anomaly localization, where a variable-wise anomaly score is desired. In embodiments, methods, systems and techniques include learning a dependency graph of multivariate data, which may be noisy. The methods, system and techniques automatically identify the number of dependencies and perform transfer learning from a training phase to a testing phase. Learned dependency graphs are used to detect anomalies in sensor networks. In one aspect, a learning performed according to an embodiment in the present disclosure may be useful in tracking inter-variable dependency, reducing the number of runs to obtain a graph that is sparse enough for interpretability (e.g., in detecting anomalies), while capturing real dependencies in the multivariate data.

In an embodiment, methods, systems and techniques may be implemented as a computer-implemented solution library, for instance, which can be integrated or plugged into a computer-implemented platform or server which may function as analytics tool, for example, in performing operations managements in an industry.

In an embodiment, an optimization is generated, which allows to automatically identify the number of conditional dependencies for a pair of variables and transfer a learning sparsity pattern and magnitude of correlations from a normal state to a testing phase. In an embodiment, a two-step algorithm based on projections and active set identification is presented. In an embodiment, a full gradient may be used for solution quality and a reduced subspace Newton direction to accelerate it; Feasibility with respect to membership in sparsity constraint is handled via projection; Symmetric positive-definiteness is ensured through a line-search; a continuation step improves solution quality and running time.

Anomaly detection, for example, via learned sparse dependency graph, in one embodiment identifies asset behavior that is outside of a defined norm that constitutes normal behavior. In an embodiment, anomaly detection algorithm is based on a probabilistic graphical model, and may detect anomalies with higher accuracy and fewer false alarms. In an embodiment, early detection of anomalies or faults in a system can lead to considerable savings of time and cost. A system and/or method of the present disclosure, for example, reduces maintenance cost for example, incurred in vessel monitoring, increases asset utilization, prevents unexpected equipment breakdowns by identifying anomalous conditions that can lead to accidents or equipment damage, and reduces false positive and false negative alerts. In industrial processing, for example, productivity of assets may be enhanced, and downtime and maintenance costs may be reduced.

A system and/or method, in an embodiment, solved a sparsity-constrained model, allows transfer learning via an algorithm. The algorithm, in one aspect, learns and transfers connectivity pattern and dependency magnitude from the normal training phase to the testing phase for the dependency matrix. In an embodiment, an additional regularization term may be included, which keeps the magnitudes of precision matrix entries to manageable amount. In an embodiment, a system and/or method selects the sparsity level of the dependency graphs a priori.

FIG. 1 is a diagram illustrating anomaly detection for multivariate noisy sensor data in one embodiment. A model building phase 102 in an embodiment includes using past dataset associated with sensors, for example, operating in a domain (e.g., industry domain), for example, in normal condition (e.g., without failure). Such dataset is considered to be normal data. For instance, dataset 104, for example, of past period (e.g., selected historical time period, e.g., a number of time series sample data points (e.g., 100 sample data points) associated with each sensor), may be obtained and a dependency graph model 106 is built based on the normal data. The dependency graph model includes nodes which represent sensors and links between the sensors during operating conditions.

During a runtime phase 108, a current dependency graph 112 from real-time sensor data 110 (data points associated with current period of time, or window of time) is built or computed. The dependency graph 106 associated with the normal state is compared with the current dependency graph 112. A change in the dependency among or between the nodes indicates anomaly in the current processing in the domain. In this way, anomalies among sensors are detected in real-world situations to predict when and where maintenance is required.

For example, at 114, a dependency graph 106 may be discovered or built based on the past sensor data 104 taken during normal operations of a process (e.g., manufacturing or industrial process). At 116, a current dependency graph 112 is computed from real-time sensor data 108. The dependency graphs 106 and 112 may be compared to identify or determine any anomaly in the current operations of the process.

As an example application, nodes in a dependency graph represent sensors, for example, monitoring different components of a process such as a manufacturing or industrial process. Dependency arcs or edges between nodes represent that the data of the sensors move together, or have a pattern of moving together. If, for example, two nodes are conditionally independent, then the value of dependency edge is zero. In one embodiment, detecting anomaly is carried out by comparing the change of dependency graphs between the training phase and testing phase.

Figure 2:
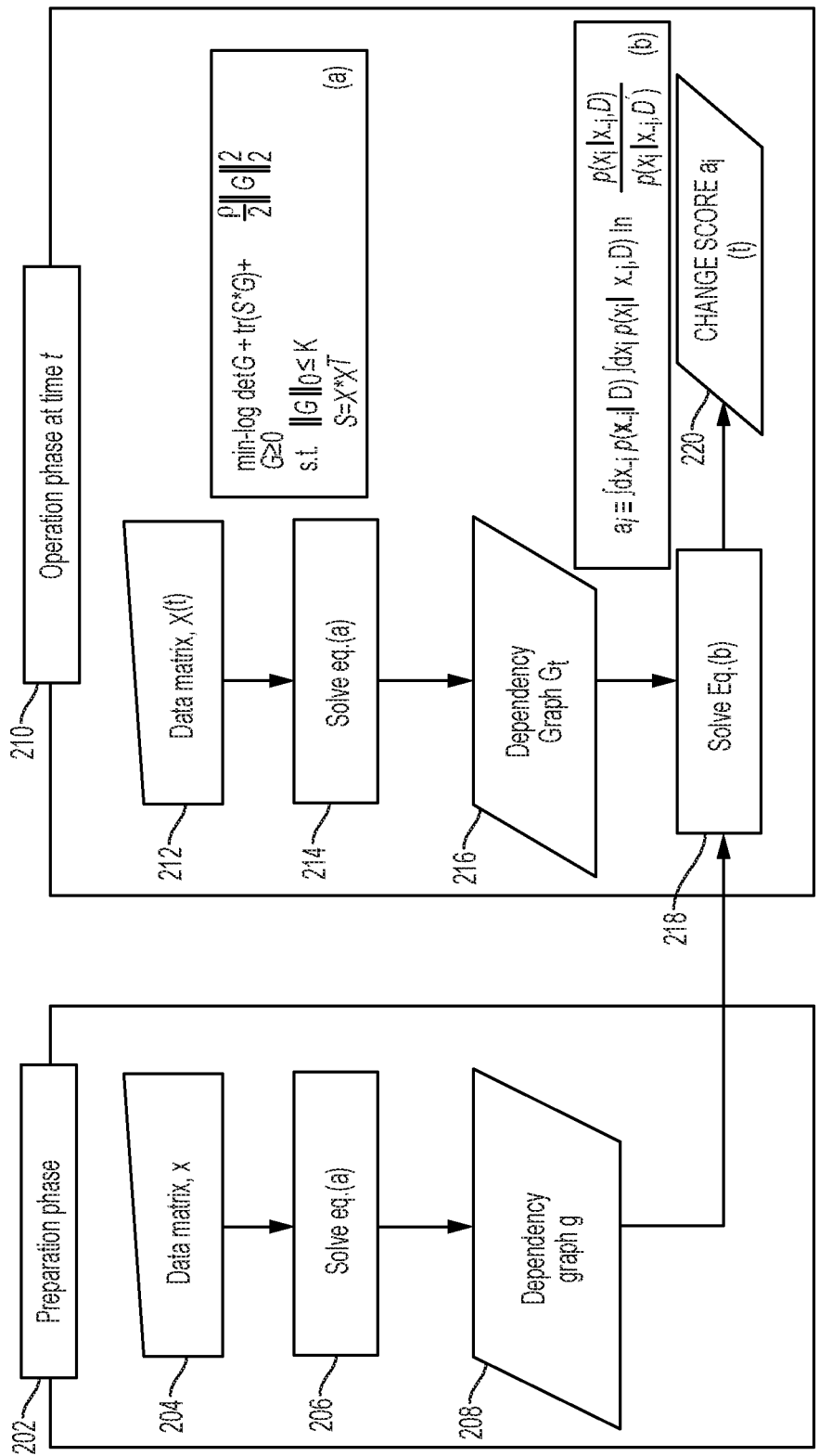
FIG. 2 is a diagram illustrating computing of a change score of a sensor in a dependency graph in one embodiment.

FIG. 2 is a diagram illustrating computing of a change score of a sensor in a dependency graph in one embodiment. A preparation phase 202, in an embodiment, includes obtaining or receiving data matrix X, which includes data such as sensor data output during an operation of a manufacturing or industrial process, for example, by a system coupled with sensors for operating the manufacturing or industrial process. For instance, for each sensor, a time series of data points (e.g., of a selected time window) associated with a system operating under normal operating conditions (e.g., no errors, faults or failures of equipment or process), may be obtained.

At 206, the data of data matrix X is input to an optimization model, Equation (a), and Equation (a) is solved subject to a specified constraint.

In an embodiment, the constraint specifies a maximum number of non-zero entries. Non-zero entries indicate a relationship between sensors. The partial correlation between two sensors, for example, is non-zero when the corresponding element of dependency matrix is non-zero. At 208, a solution to Equation (a) creates a dependency graph G (e.g., a Gaussian graphical model).

An operation phase 210, for example, at time t, in an embodiment, includes obtaining or receiving data matrix $X^{(t)}$ 212, for example, sensor data output during a manufacturing or industrial process at time window (t), which may be the current time or near current time. At 214, the data of data matrix $X^{(t)}$ 212 is input to the optimization model, Equation (a), and Equation (a) is solved subject to a specified constraint. At 216, the solution of the optimization model (Equation (a)) creates a dependency graph $G_t$, (e.g., a Gaussian graphical model) associated with the current data (operations data of time t window).

In another aspect, at 214, Equation (c) may be solved using both data matrix X 210 and data matrix $X^{(t)}$ 212 to create the dependency graph $G_t$, for example, in lieu of Equation (a).

The dependency graph G 208 and the dependency graph $G_t$ 216 are input to another model, Equation (b), and Equation (b) is solved at 218. Solving Equation (b) produces a change score $a_i$ (anomaly score for sensor i) at time t 220, for each sensor considered. For example, an anomaly score for each sensor is determined, for example, by solving Equation (b).

$$\min_{X>0} \langle S, X \rangle - \log \det(X) + \frac{\rho}{2}\|X\|_F \quad \text{Equation (a)}$$
$$\text{s.t. } \|X\|_0 \leq \kappa,$$
$$\text{s.t. } X_{i,j} = 0, \text{ if } x_i \text{ and } x_j \text{ are conditionally independent}$$

$$a_i = \int dx_{-i} p(x_{-i} \mid D) \int dx_i p(x_i \mid x_{-i}, D) \ln\left(\frac{p(x_i \mid x_{-i}, D)}{p(x_i \mid x_{-i}, D')}\right) \quad \text{Equation (b)}$$

where D is the training data set and D' is the testing data set. A detailed formula is given in Equation (8) below.

$$\min_{X>0} \langle S, X \rangle - \log \det(X) + \frac{\rho}{2}\|X - X_{train}\|_F \quad \text{Equation (c)}$$
$$\text{s.t. } \|X\|_0 \leq \kappa,$$
$$\text{s.t. } X_{i,j} = 0, \text{ if } x_i \text{ and } x_j \text{ are conditionally independent}$$

In the above formulations, S represents the sample covariance of the user-inputted data, X represents the dependency graph to be learned at time t (also referred to as $X^{(t)}$ above), and $X_{train}$ represents the dependency graph from the normal operation phase (i.e., the training phase), ρ represents a regularization parameter, $\|\cdot\|_F$ represents a norm term. Details of the formulations are described further below.

In an embodiment, the L0 ($l_0$)-constraint ($\|X\|_0 \leq K$) guarantees that the solution admits a level of sparsity. In an embodiment, the quadratic penalty $$\left(\frac{\rho}{2}\|X - X_{train}\|_F\right)$$

encourages the capacity of selecting groups in the presence of highly correlated variables and transfer learning. The models of Equations (a) and (b) are non-convex models, which may be challenging to solve, and in embodiments, optimization algorithms are provided to solve such non-convex models.

In an embodiment, the problem of anomaly localization in a sensor network for multivariate time-series data is considered by computing anomaly scores for each variable separately. A system and/or method in an embodiment evaluate a difference measure using the conditional expected Kullback-Liebler divergence between two sparse Gaussian graphical models (GGMs) learned from different sliding windows of the dataset. To estimate the sparse GGMs, an optimization model is provided and the system and/or method in an embodiment constrain the number of nonzeros ($l_0$ norm) in the learned inverse covariance matrix and apply an additional $l_2$-regularization in the objective. In an embodiment, a projected gradient algorithm efficiently solves this nonconvex problem. Numerical evidence supports the benefits of using the model and method over the usual convex relaxations (i.e., $l_1$-regularized models) for learning sparse GGMs in this anomaly localization setting.

Anomaly localization of the present disclosure in an embodiment determines or computes a variable-wise anomaly score. In wireless sensor networks, e.g., in addition to determining whether or not a network is behaving anomalously, it is useful to determine or know what aspect of the network is anomalous. For example, if a sensor network takes measurements from different car parts of a prototype automobile on a test track, then it is valuable to the field engineers to know which car parts are contributing to an anomalous behavior, e.g., more than simply knowing that the car as a whole is behaving anomalously. Similar problem settings can be found across different application domains: monitoring mechanical stresses in buildings and bridges, identifying the sources of flooding or forest fires, pinpointing the change points in stock price time series, finding sources of serious threats in computer networks, and identifying car loss.

In an embodiment, sparse dependency graphs (e.g., GGMs) are learned in the context of anomaly localization. In an embodiment, a model is presented to learn a sparse dependency graph where both sparsity pattern and numeric values are taken into account. GGM-learning model employing both an $l_0$ constraint and an $l_2$-regularization, along with an optimization algorithm to solve it, outperforms other models including typical $l_1$-regularized models. In one aspect, the system and/or method leverage the conditional expected Kullback-Liebler (KL) divergence method in computing anomaly scores for each variable. A comparative study conducted on various GGM-learning models and scoring methods for assigning anomaly scores demonstrates efficiency of a system and method in an embodiment. Using $l_0$ norm-based methods can present computationally challenging issues. The system and/or method in an embodiment provide $l_0$-constrained GGM learning algorithms in the anomaly detection setting. In an embodiment, an $l_0$-constrained $l_2$-regularized model learns a sparse dependency graph for anomaly localization, and a proximal gradient algorithm handles both an $l_0$ constraint and a positive-definite constraint.

In an embodiment, the following notations are used. For any $X \in \mathbb{R}^{n \times n}$, $\nabla f(X)$ denotes the gradient of f, which is a matrix in $\mathbb{R}^{n \times n}$. Notation tr(X) denotes the trace operator, i.e., $\Sigma_{i=1}^n X_{i,i}$. The vectorization operator vec(X) transforms X into a vector in $\mathbb{R}^{n^2}$ by stacking the columns from left to right. $\sigma_1(X)$ and $\sigma_n(X)$ denote the minimum and maximum eigenvalues of X, respectively. Given an index set $F \subset \{1, \ldots, n\} \times \{1, \ldots, n\}$, $[X]_F$ denotes the matrix obtained from the identity matrix $I_n$ by replacing the (i, j)-th entry by $X_{i,j}$ for all (i, j)∈F. Let ⊗ denote the Kronecker product of matrices and let $e_i$ denote a unit vector with a 1 in the ith coordinate. For any finite set S, |S| denotes the number of elements of S.

Learning Sparse Graphical Models

The following describes optimization models that the system and/or method use in an embodiment to learn sparse precision matrices. Given m data samples $\{y_1, \ldots y_m\} \subseteq R^n$, the system in an embodiment considers fitting an n-variate Gaussian distribution $N(\mu, X^{-1})$ to the data, where $\mu$ denotes the mean and X is the precision matrix. In an embodiment, it is assumed the data is centered so that $\mu=0$. Zeros in X indicate conditional independence between two variables. To estimate the unknown parameter X, a maximum likelihood problem as follows may be solved, $$\min_{X \succ 0} \; tr(S\;X) - \log \det(X), \tag{1}$$

where $X \succ 0$ denotes a positive definite constraint. In an embodiment, the empirical covariance matrix is defined as $$S = \frac{1}{m} \sum_{i=1}^{m} y_i y_i^T.$$

The solution $X \in R^{n \times n}$ is the estimated inverse covariance, which describes a Gaussian graphical model (GGM). However, in general, due to noise in the data, X obtained from Equation (1) is a dense matrix and thus the conditional dependencies suggested by X may reveal very little. For reasons of interpretability, sparsity in the matrix X is desired.

The sparse graphs for anomaly localization have been computed by solving the well-studied $l_1$-regularized maximum likelihood problem, i.e., $$\min_{X \succ 0} \; tr(S\;X) - \log \det(X) + \lambda \|X\|_1, \tag{2}$$

where $\|X\|_1 = \Sigma_{i,j=1}^{n} |X|$ is the element-wise $l_1$ norm of the matrix X, and $\lambda > 0$ is a regularization parameter to control sparsity. Equation (2) is a convex problem, and generally admits a unique global minimizer. Thus, given S, selecting a sparse graph is a matter of computing a regularization path by varying $\lambda$ and cross-validating the solutions along the path. Since sensor data of industrial applications are very noisy in general, some useful interaction information among the variables in the graph can be omitted.

Enforcing sparsity in the constraint set instead of in the objective function may avoid bias. In an embodiment, the system and/or method of the present disclose and solve a model that estimates sparse graphs. In an embodiment, the system and/or method directly constrains sparsity by specifying a maximally allowable number of nonzeros $\kappa$ in the optimal solution and adds a quadratic penalty $$\min_{X \succ 0} \; tr(S\;X) - \log \det(X) + \frac{\lambda}{2} \|X\|_F^2 \tag{3}$$
$$\text{s.t.} \quad \|X\|_0 \leq \kappa,$$

where $\lambda > 0$ is a regularization parameter and the Frobenius norm term $\|X\|_F^2 = \Sigma_{i,j=1}^{n} |X_{ij}|^2$ is also referred to as $l_2$-regularization. The present disclosure denotes by $\|\bullet\|_0$ the number of nonzeros of the argument, the so-called $l_0$-norm. The $l_0$-constraint guarantees that the solution admits a level of sparsity, while the quadratic penalty encourages the capacity of selecting groups in the presence of highly correlated variables. Without the regularization, some entries of the purely $l_0$-constrained model can have relatively large magnitudes. The associated anomaly scores significantly dominate the others, and thus some faulty variables can be overlooked. Hence, in an embodiment, the $l_2$-regularization term keeps the magnitude of all entries uniformly similar. From a computational point of view, the $l_2$-term makes the problem of Equation (3) better-behaved. The objective function is strongly convex and the optimal solution set is bounded. Thus, it is expected to be solved more efficiently. In an embodiment, the $l_0$-constraint and the $l_2$-regularization are combined. Because of the presence of the $l_0$ constraint, it may be challenging to solve problem of Equation (3); in an embodiment, an efficient proximal gradient algorithm is presented to handle the problem.

In an embodiment, the model of Equation (3) can be used to learn dependency graphs in both the train phase and the testing phase, for example, learning a sparse GGM for anomaly detection. In an embodiment, the system and/or method may also use the following for the testing phase $$\min_{X \succ 0} \; tr(S\;X) - \log \det(X) + \frac{\lambda}{2} \|X - X_{normal}\|_F^2 \tag{4}$$
$$\text{s.t.} \quad \|X\|_0 \leq \kappa, \|$$

where $X_{normal}$ is a precision matrix from a normal state. The system and/or method in one embodiment perform transfer learning for sparsity pattern and magnitude of correlations from the normal state to the testing phase.

$$\min_{X \succ 0} \; tr(SX) - \log \det(X) \tag{5}$$
$$\text{s.t.} \quad \|X\|_0 \leq \kappa.$$

$$\min_{X \succ 0} \; tr(SX) - \log \det(X) + \lambda_1 \|X\|_1 + \lambda_2 \|X\|_F^2. \tag{6}$$

Equations (5) and (6) represent additional models, which may be applied in learning a sparse GGM for anomaly detection algorithms, for instance, in the context of anomaly localization. Equation (6) is an $l_1$-based "elastic net" version for GGM model.

Methods for Computing Anomaly Score of Each Variable

The following describes embodiments of techniques that perform a change analysis, e.g., assigning anomaly scores to individual variables to measure the magnitude of their contributions to the observed differences between two GGMs from training and testing datasets. The techniques, for example, in embodiments, implement the processing shown at 120 in FIG. 1.

Conditional Expected KL-Divergence

The system and/or method in an embodiment may consider the conditional expected Kullback-Liebler divergence between two learned GGMs to compute anomaly scores. Given two probabilistic models A and B with respective distributions $p_A$ and $p_B$, the system and/or method consider the expected KL divergence $d_i^{AB}$ between the marginal distributions $p_A(x_i|z_i)$ and $p_B(x_i|z_i)$ $$d_i^{AB} = \int dz_i p_A(z_i) \int dx_i p_A(x_i \mid z_i) \ln \frac{p_A(x_i \mid z_i)}{p_B(x_i \mid z_i)}, \quad (7)$$

for each variable i. By swapping A and B in Equation (7), the system and/or method obtain a symmetric formula for $d_i^{BA}$. Because the system and/or method are learning GGMs, the formula of Equation (7) takes a special form that reduces to matrix-vector multiplications. For the i-th variable, and for a learned GGM X, let $$X = \begin{bmatrix} L & l \\ l^T & \alpha \end{bmatrix}, X^{-1} = \begin{bmatrix} W & w \\ w^T & \beta \end{bmatrix} \quad (7b)$$

be permuted such that the last row and column of X, $X^{-1}$ correspond to the i-th variable. Then, letting $X^A$ and $X^B$ denote the GGMs learned from datasets A and B respectively, it can be shown $$d_i^{AB} = w^{A^T}(l^B - l^A) + \quad (8)$$
$$\frac{1}{2}\left[\frac{l^{B^T}W^A l^B}{\alpha^B} - \frac{l^{A^T}W^A l^A}{\alpha^A}\right] + \frac{1}{2}\left[\ln\frac{\alpha^A}{\alpha^B} + \beta^A(\alpha^B - \alpha^A)\right].$$

The system and/or method then define the anomaly score of the ith variable as $$d_i = \max\{d_i^{AB}, d_i^{BA}\}. \quad (9)$$

When a threshold t>0 is selected, $d_i$>t is an indication that the i-th variable is anomalous, while $d_i \leq t$ is an indication that the ith variable is healthy. Alpha and beta, L and W notations are components of matrices X and $X^{-1}$ when they are broken up as in equation (7b).

Stochastic Nearest Neighbors

The system and/or method in an embodiment may consider using a stochastic nearest neighbors approach to anomaly scoring. Let $S^A$ and $S^B$ denote the sample covariance matrices of datasets A and B respectively, and let $S_i^A$, $S_i^B$ denote the ith columns of $S^A$ and $S^B$ respectively. For a sparse GGM $X^A$ learned for dataset A, define an indicator vector associated with the ith variable $1_{A,i}$ coordinate-wise by $$[l_{A,i}]_j = \begin{cases} 1 & \text{if } i \text{ and } j \text{ are adjacent in } X^A \\ 0 & \text{otherwise.} \end{cases} \quad (10)$$

Then, a measure of the dissimilarity between the neighborhoods of the ith variable between the GGMs for A and B, weighted by the sample covariances of the two datasets, is given by $$d_i^{AB} = \left| \frac{l_{A,i}^T (S_i^A - S_i^B)}{(1 + l_{A,i}^T S_i^A)(1 + l_{A,i}^T S_i^B)} \right| \quad (11)$$

Symmetrically, the system and/or method define $d_i^{BA}$ and then compute an anomaly score $d_i$ as in Equation (9). "T" in the equations stands for the transpose of a vector or matrix.

Sparsest Subgraph Approximation

The system and/or method in an embodiment may consider using sparsest subgraph approximation technique to score anomaly. Given two (sparse) dependency graphs, e.g. $X^A$ and $X^B$ consider a graph given by an (also sparse) adjacency matrix A defined entrywise by $\Lambda_{ij} = |X_{ij}^A - X_{ij}^B|$. The problem of finding an independent set (a set of mutually disconnected nodes) of size k in $\Lambda$ is generalized to finding a "sparsest k-subgraph" in $\Lambda$:

$$\min_{d \in \{0,1\}^n} d^T \Lambda d \text{ subject to } 1_n^T d = k, \quad (12)$$

where $1_n$ denotes a vector of ones. Intuitively, the solution to Equation (12) identifies a set of k nodes that change the least between $X^A$ and $X^B$, suggesting a healthy (non-anomalous) set of nodes. However, (12) is a mixed-integer quadratic programming (MIQP) formulation, the solution of which is generally NP-hard, and moreover requires foreknowledge of the magnitude of k, the size of the supposedly healthy set of nodes. Therefore, the system and/or method may use a convex QP relaxation (solvable in polynomial time)

$$\min_{d \in R^n} d^T \Lambda_\mu d \text{ s.to } 1_n^T d = 1, d \geq 0_n, \quad (13)$$

where $0_n$ is a vector of zeros and $\Lambda_\mu = \Lambda + \mu I_n$ is the original matrix $\Lambda$ with an added scaled identity with $\mu \geq 0$ sufficiently bounded away from zero to enforce the positive definiteness of $\Lambda_\mu$. With this relaxation, the solution d* to Equation (13) can be interpreted as anomaly scores.

In an embodiment, the system and/or method uses the $l_0$-$l_2$ based model of Equations (3) and (4) to learn a sparse GGM in the training phase and the testing phase respectively, and computes anomaly scores for each variable by applying the conditional expected KL divergence of Equation (9).

Optimization Algorithm for $l_0$ Sparse Models

In embodiments, the system and/or method implements a projected gradient algorithm for solving the learning problems or models of Equation (3) and Equation (4).

Projected Gradient Newton Algorithm

In an embodiment, a projected gradient Newton algorithm with warm starts may solve the $l_0$-constrained inverse covariance learning problems of Equations (3) and (4). The following describes a method for solving Equation (3), and the method also can be applied to Equation (4). It is noted when A is small, Equation (3) is difficult to be solved. In an embodiment, instead of directly solving (3), the system and/or method solves a sequence of subproblems parameterized by a bigger $\lambda > 0$, $$\min_{X > 0} f(X) = tr(SX) - \text{logdet}(X) + \frac{\lambda}{2}\|X\|_F^2 \quad (14)$$
$$\text{s.t.} \quad \|X\|_0 \leq \kappa$$
$$X_{i,j} = 0 \ \forall (i,j) \in I,$$

where the system and/or method denote the Frobenius norm by $\|X\|_F^2 = \Sigma_{i,j=1}^n |X_{ij}|^2$. The objective of Equation (14) is strongly convex and the optimal solution set of Equation (14) is bounded. The $l_2$ regularizer makes the subproblems better-conditioned, possibly allowing for finding higher quality local minima of Equation (14) faster. By driving $\lambda$ to zero in Equation (14), an optimal solution for Equation (3) can be obtained. Thus, to yield a practical algorithm, the system and/or method in an embodiment consider a sequence of strictly decreasing values $\{\lambda_k\}$; in the k-th iteration of an algorithm, the system and/or method seek an approximate local minimizer to Equation (14) with $\lambda=\lambda_k$. On the (k+1)-th iteration, the system and/or method warm start the solution of the (k+1)-th subproblem with the solution to the k-th subproblem as an initial point.

Before analyzing optimality conditions of (3) or (14), a hardness result may be proved, for example, demonstrating that for any $\kappa>0$ in Equation (3), there exists no $\lambda>0$ such that an optimal solution to the $l_1$ regularized model of Equation (2) with regularization parameter $\lambda$ recovers the global optimum of Equation (3). This suggests solving Equation (3) without resorting to convex formulations.

Theorem 1. For any $\kappa \geq n$, there exists no value of $\lambda>0$ such that an optimal solution of (2) globally minimizes (3).

Proof 1. Towards a contradiction, suppose there exists $\kappa \geq n$ and $\lambda>0$ such that X is a global minimizer of both (2) and (3). Define $Y=X^{-1}$ and $\Psi(X)=-\log \det(X)+tr(SX)$. Since S is positive semi-definite and nonzero, there exists at least one diagonal entry $S_{ii}>0$. Without loss of generality, suppose $S_{11}>0$. For any $\alpha$ such that $|\alpha|<\min(X_{11}, \sigma_1(X))$, both $\|X+\alpha e_1 e_1^T\|_0 = \|X\|_0 \leq \kappa$ and $X+\alpha e_1 e_1^T$ are positive definite. Additionally, since $(X+\alpha e_1 e_1^T)_{kl}=0$ for any $(k,l) \in I$ it may be concluded that $X+\alpha e_1 e_1^T$ is feasible in Equation (3) for every $\alpha$ such that $|\alpha|<\min(X_{11}, \sigma_1(X))$.

Moreover, using a property of determinants, $$\psi(X + \alpha e_1 e_1^T) - \psi(X) = -\log(\det(X)(1 + \alpha Y_{11})) +$$
$$tr(S(X + \alpha e_1 e_1^T)) +$$
$$\log \det(X) - tr(SX)$$
$$= -\log(1 + \alpha Y_{11}) + \alpha S_{11} \triangleq g(\alpha).$$

Note that if X is a minimizer of Equation (3), then $g(\alpha) \geq 0$ for every $|\alpha|<\min(X_{11},\sigma_1(X))$. Since g is a convex one-dimensional function of $\alpha$ in the neighborhood of zero and $g(0)=0$, it may be concluded that $g'(0)=0$. This implies that $S_{11}=Y_{11}$. From a characterization of optimal solutions of Equation (2), if X is optimal for Equation (2), then $S_{11}=Y_{11}-\lambda$. Since $\lambda>0$, this is a contradiction.

First-Order Stationarity Conditions

The following characterizes properties of Equation (14), for example, concerning the boundedness of the set of optimal solutions and appropriate optimality conditions for Equation (3). In an embodiment, it may be assumed that the $l_2$-regularization parameter $\lambda>0$. For ease of notation, the sparsity constraint set is defined as $$\omega \triangleq \{X \in R^{n \times n} : \|X\|_0 \leq \kappa, X_{i,j}=0 \forall (i,j) \in I\},$$

and the projection operator $$P_\Omega(X) \triangleq \underset{Y \in \Omega}{\operatorname{argmin}} \|X - Y\|_F.$$

It may be noted that the gradient of the objective function in Equation (14) is $$\nabla f(X) = S - X^{-1} + \lambda X,$$

and the Hessian is $$\nabla^2 f(X) = X^{-1} \otimes X^{-1} + \lambda I_n^2.$$

It is shown in the following theorem that Equation (14) can be safely reformulated in such a way that the feasible set is compact.

Theorem 2. Assume that problem of Equation (14) is feasible and $\lambda>0$. Consider the problem $$\min_{X \succeq 0} \quad tr(SX) - \log \det(X) + \frac{\lambda}{2}\|X\|_F^2 \quad (15)$$
$$\text{s.t.} \quad \|X\|_0 \leq \kappa$$
$$X_{i,j} = 0, \forall (i,j) \in I$$
$$\underline{\sigma} I_n \preceq X \preceq \overline{\sigma} I_n,$$

where there are fixed constants $$\overline{\sigma} = \frac{n^2 + \sqrt{n^4 + 2\lambda n f(tI_n) - 2\lambda n^2}}{\lambda},$$

$$\underline{\sigma} = \exp^{-f(tI_n) + \frac{n\lambda}{2} \exp^{-2f(tI_n)} \overline{\sigma}^{-2-2n} \overline{\sigma}^{1-n}},$$

and $$t = \frac{-tr(S) + \sqrt{tr(S)^2 + 4n^2\lambda}}{2n\lambda}.$$

Then, the sets of global minima of Equation (14) and Equation (15) are equivalent.

Proof 2. Suppose $X^* \in R^{n \times n}$ is an optimal solution of Equation (14) and $0<\sigma_1 \leq \ldots \leq \sigma_n$ are the eigenvalues of $X^*$. The system and/or method in an embodiment seek lower and upper bounds for $\sigma_1$ and $\sigma_n$, respectively.

Consider $\overline{X}=tI_n$ for an arbitrary fixed scalar $t>0$. $\overline{X}$ is feasible with respect to the constraints of Equation (14), and $$f(\overline{X}) \geq f(X^*) = \quad (16)$$
$$tr(SX^*) - \log \det(X^*) + \frac{\lambda}{2}\|X\|_F^2 \geq -\log \det(X^*) + \frac{\lambda}{2}\sum_{i=1}^n X_{ii}^{*2} \geq$$
$$-n \log(\sigma_n) + \frac{\lambda}{2n}\left(\sum_{i=1}^n X_{ii}^*\right)^2 \geq -n \log(\sigma_n) + \frac{\lambda}{2n}\sigma_n^2.$$

The second inequality is due to the fact that $S \succeq 0$ and $X^* \succ 0$, and thus $tr(SX^*) \geq 0$. The third inequality uses the Cauchy-Schwarz inequality, and the last inequality holds because $\Sigma_{i=1}^n X_{ii}^* = \Sigma_{i=1}^n \sigma_i$ and $\sigma_i>0$. Combining Equation (16) with the fact that $\log(\sigma_n) \leq \sigma_n - 1$, the system and/or method get $$f(\overline{X}) \geq -n(\sigma_n - 1) + \frac{\lambda}{2n}\sigma_n^2. \quad (17)$$

The right-hand side of Equation (17) tends to infinity as $\sigma_n \to \infty$; since $f(\overline{X})$ is finite for the fixed value of t, $\sigma_n$ is bounded from above. Specifically, $\sigma_n$ cannot exceed the larger of the two solutions to the quadratic equation $$\frac{\lambda}{2n}\sigma_n^2 - n(\sigma_n - 1) - f(\overline{X}) = 0.$$

That is, $$\sigma_n \leq \overline{\sigma} \triangleq \frac{n^2 + \sqrt{n^4 + 2\lambda n f(\overline{X}) - 2\lambda n^2}}{\lambda} < \infty. \quad (18)$$

Likewise, a lower bound for $\sigma_1$ is estimated as $$f(\overline{X}) \geq f(X^*) \geq -\log \det(X^*)$$

$$\geq -\log(\sigma_1) - (n-1)\log(\overline{\sigma}),$$

from which it may be concluded $$\sigma_1 \geq \exp(-f(\overline{X}))\overline{\sigma}^{1-n}. \quad (19)$$

In an embodiment, this bound can be tightened further. Starting from an intermediate step in the derivation of (16), there is $$f(\overline{X}) \geq -\log\det(X^*) + \frac{\lambda}{2n}\left(\sum_{i=1}^{n}\sigma_i\right)^2 \geq -\log(\sigma_1) - (n-1)\log(\overline{\sigma}) + \frac{n\lambda}{2}\sigma_1^2 \geq$$

$$-\log(\sigma_1) - (n-1)\log(\overline{\sigma}) + \frac{n\lambda}{2}\exp(-2f(\overline{X}))\overline{\sigma}^{2-2n}.$$

Thus, $$\sigma_1 \geq \underline{\sigma} \triangleq \exp^{-f(\overline{X}) + \frac{n\lambda}{2}\exp^{-2f(\overline{X})}\overline{\sigma}^{2-2n}}\overline{\sigma}^{1-n} > 0. \quad (20)$$

From Equations (18) and (20), in order to tighten the bounds $\underline{\sigma}$ and $\overline{\sigma}$, the system and/or method may choose t so that $f(\overline{X}) = f(tI_n)$ is minimized. Observe that $$f(tI_n) = tr(S)t - n\log(t) + \frac{n\lambda}{2}t^2$$

is a strongly convex one-dimensional function in t for t>0. Thus $f(tI_n)$ is minimized when the necessary optimality condition $$\frac{d}{dt}f(tI_n) = 0$$

is satisfied; thus the following is chosen $$t = \frac{-tr(S) + \sqrt{tr(S)^2 + 4n^2\lambda}}{2n\lambda},$$

which completes the proof.

The following introduces in Theorem 3 optimality conditions for problem (14). For any positive definite matrix H and a scalar t>0, define $$h_{t,H,X}(Z) = tr(\nabla f(X)^T(Z-X)) + \frac{1}{2t}\|Z-X\|_H^2, \quad (21)$$

$$S_{t,H}(X) = \arg\min_{Z\in\Omega} h_{t,H,X}(Z) \quad (22)$$

$$= \arg\min_{Z\in\Omega} P\|Z - (X - t\langle H, \nabla f(X)\rangle)\|_{H^{-1}}^2,$$

where $\|X\|_H = \sqrt{vec(X)^T H vec(X)}$.

Theorem 3. Suppose that X* is an optimal solution of (14) and H is positive definite. Then there exists T>0 such that $$X^* = S_{t,H}(X^*) \text{ for all } t \in (0,T). \quad (23)$$

Proof 3. From Theorem 2, there is, any optimal solution X* of (14) satisfies $\underline{\sigma} I_n \preceq X^*$, where $\underline{\sigma} > 0$ is independent of X*. Since $\nabla^2 f(X^*) = X^{*-1} \otimes X^{*-1} + \lambda I_{n^2}$, it follows that $\nabla^2 f(X^*) \preceq (\underline{\sigma}^{-2} + \lambda) I_{n^2}$. Hence, there is, from strong convexity that $$f(Y) \leq f(X^*) + tr(\langle \nabla f(X^*), (Y-X^*)\rangle) + \frac{1}{2L_f}\|Y - X^*\|_F^2, \quad (24)$$

for all $Y \in \Omega$, where $L_f = (\underline{\sigma}^{-2} + \lambda)^{-1}$. It is shown that (23) holds for $T = \sigma_1(H)L_f$. First, it is demonstrated that $X^* \in S_{t,H}(X^*)$ for any $t \in [0, T)$. This first claim is a statement concerning existence of X*. The following subsequently proves uniqueness of X*, which proves the theorem. From (24) and since $$\frac{1}{t}H \succ \frac{1}{L_f}I_n$$

for all $t \in [0, T)$, there is, for all $Y \in \Omega$ $$f(X^*) \leq f(Y) \leq f(X^*) + tr(\nabla f(X^*)(Y - X^*)) + \frac{1}{2t}\|Y - X^*\|_H^2.$$

It follows that $$h_{t,H,X^*}(Y) = tr(\nabla f(X^*)(Y - X^*)) + \frac{1}{2t}\|Y - X^*\|_H^2 \geq 0$$

for all $Y \in \Omega$. Thus $X^* \in S_{t,H}(X^*)$ since $h_{t,H,X^*}(X^*) = 0$, proving the claim.

To prove uniqueness, suppose towards contradiction that there exists $\hat{X} \in S_{t,H}(X^*)$ satisfying (23), but $\hat{X} \neq X^*$. Noting that by definition $h_{t,H,X^*}(X^*) = 0$, we must have $h_{t,H,X^*}(\hat{X}) = 0$, and so $$tr(\nabla f(X^*)(\hat{X} - X^*)) = -\frac{1}{2t}\|\hat{X} - X^*\|_H^2. \quad (25)$$

Combining (24) and (25), there is, $$f(\hat{X}) \leq f(X^*) + tr(\nabla f(X^*)(\hat{X} - X^*)) + \frac{1}{2L_f}\|\hat{X} - X^*\|_F^2 = \quad (26)$$

$$f(X^*) - \frac{1}{2}(\hat{X} - X^*)^T\left(\frac{H}{t} - \frac{I_n}{L_f}\right)(\hat{X} - X^*) < f(X^*),$$

which contradicts the global optimality of X* for (14).

For a general positive definite matrix H, solving the problem defining $S_{t,H}(X)$ in (22) is generally intractable due to the cardinality constraint. As a result, verifying the optimality condition (23) is computationally expensive. The following lemma offers a simpler condition, which is an immediate consequence of Theorem 3 when $H=I_n$. A similar result was established, but for a slightly different constraint set $\Omega$.

Lemma 1. Suppose that $X^*$ is an optimal solution of (14). Then there exists $T>0$ such that $$X^* = P_\Omega(X^* - t\nabla f(X^*)) \text{ for all } t \in (0, T). \tag{27}$$

In one aspect, a subsequent convergence analysis relies on Lemma 1. The following states and proves a technical proposition regarding the operator $S_{t,I_n}$, concerning how it acts on convergent sequences.

Proposition 1. Let $t>0$. Suppose $\{X^k\}$ is a sequence in $R^{n \times n}$ converging to $X^*$, and suppose there exists a corresponding sequence $\{Y^k\}$ such that $Y^k \in S_{t,I_n}(X^k)$ for each k. If there exists $Y^*$ such that $Y^k \to Y^*$, then $Y^* \in S_{t,I_n}(X^*)$.

Proof 4. Since $Y^k \in \Omega$ for each k and $\Omega$ is closed, it is concluded that $Y^* \in \Omega$. Hence, it is obtained from the definition of $S_{t,I_n}(X^*)$ that $$\|Y^* - (X^* - t\nabla f(X^*))\|_F \ge \min_{Y \in \Omega} \|Y - (X^* - t\nabla f(X^*))\|_F \tag{28}$$

If inequality (28) holds as an equality, then the proposition is proven. Towards a contradiction, suppose (28) holds as a strict inequality. Then, for all k, $$\|Y^* - (X^* - t\nabla f(X^*))\|_F > \min_{Y \in \Omega} \|Y - (X^* - t\nabla f(X^*))\|_F \tag{29}$$

$$\ge \left\| \min_{Y \in \Omega} \|Y - (X^k - t\nabla f(X^k))\|_F - \|(X^* - t\nabla f(X^*)) - (X^k - t\nabla f(X^k))\|_F \right\|$$

$$= \|\|Y^k - (X^k - t\nabla f(X^k))\|_F - \|(X^* - t\nabla f(X^*)) - (X^k - t\nabla f(X^k))\|_F\|,$$

where the second inequality follows from the triangle inequality, and the equality follows from the definition of $Y^k$. As $k \to \infty$, (29) implies $$\|Y^* - (X^* - t\nabla f(X^*))\|_F > \|Y^* - (X^* - t\nabla f(X^*))\|_F,$$

a contradiction.

Algorithm Description

An algorithm is presented to solve a general problem of the form $$\min\{f(X): X \in R^{n \times n}, \|X\|_0 \le \kappa, X_{i,j}=0, \forall (i,j) \in I, X \succ 0, X=X^T\}, \tag{30}$$

where f is twice differentiable on its domain. In an embodiment, a strategy for solving the constrained optimization problem is to embed approximate Newton method into a projected gradient method. In this algorithm, feasibility with respect to sparsity constraint $\Omega$ is handled via projection, while the symmetric positive-definiteness of the iterates (i.e. feasibility with respect to $\{X \succ 0\}$) in ensured through a line-search procedure. Convergence analysis can be applied, for example, when the objective function has the special structure as in (14):

$$f(X) = tr(SX) - \text{logdet}(X) + \frac{\lambda}{2}\|X\|_F^2.$$

A particular issue in the case of applying a projected gradient method to (30) is that the constraint set of (30) is nonconvex and not closed. This is a different situation from problems in the conventional scope of projected gradient methods, which require the feasible set to be convex and closed. In one aspect, due to the openness of the positive-definite (PD) constraint, directly applying a projected gradient method to Equation (30) is difficult. In an embodiment, a methodology of the present disclosure avoids dealing with the PD constraint in the projection step.

In an algorithm of the present disclosure in an embodiment, the projected gradient direction and the approximate Newton step are alternatively employed. On each gradient search step, the algorithm begins from a feasible iterate $X^k$ and then backtrack along the projection are defined by $P_\Omega(X^k - \alpha_k \nabla f(X^k))$, initializing the stepsize $\alpha_k > 0$ with a Barzilai-Borwein (BB) stepsize [1]:

$$\alpha_k^{BB} = \frac{tr\left((\nabla f(X^k) - \nabla f(X^{k-1}))^T (X^k - X^{k-1})\right)}{\|X^k - X^{k-1}\|_F^2}.$$

BB-stepsizes perform better when they are embedded in a nonmonotone line search. In an embodiment, a scheme based on the Grippo-Lampariello-Lucidi (GLL) stepsize rule is considered. Let $f_{max}^k$ denote the largest of the M most recent function values:

$$f_{max}^k = \max\{f(X^{k-j}): 0 \le j < \min(k, M)\}.$$

This quantity $f_{max}^k$ is used to define a sufficient decrease condition. For instance, the algorithm terminates the backtracking procedure for computing $X^{k+1} = P_\Omega(X^k - \alpha_k \nabla f(X^k))$ by gradually reducing $\alpha_k$ once the following conditions (C1) and (C2) are both satisfied:

(C1) A sufficient decrease condition for the objective function value is attained, i.e.

$$f(X^{k+1}) \le f_{max}^k - \frac{\delta}{2} \|X^{k+1} - X^k\|_F^2,$$

for some algorithmic parameter $\delta > 0$.

(C2) The next iterate $X^{k+1}$ is feasible with respect to the positive definite constraint, i.e. $X^{k+1} \succ 0$.

In an embodiment, to accelerate convergence and make use of the fact that the optimal solution is often very sparse in many applications, i.e., $\kappa \ll n^2$, the algorithm in the present disclosure may additionally incorporate projected approximate Newton steps, by using second-order information in a reduced subspace. At each iterate $X^k$, a local quadratic model of the objective function can be minimized subject to the constraint that all but a working set $W_k$ of the matrix entries will not be fixed to zero in the minimization. In an embodiment of the algorithm, $W_k$ may be chosen as $$W_k = \{(i,j): X_{i,j}^k \ne 0\} \cup O_k \tag{31}$$

or $$W_k = \{(i,j): Y_{i,j} \ne 0 \text{ for some } Y \in P_\Omega(X^k - \alpha_k \nabla f(X^k))\} \cup O_k, \tag{32}$$

where $\alpha_k > 0$ is a step size and $O_k$ is a set of indices corresponding to the $\lceil \eta \kappa \rceil$ largest absolute values of entries in $X^k$-$X^{k-1}$ for some (small) $\eta \in (0,1)$. The inclusion of $O_k$ helps to close the optimality gap faster when the condition (27) in Lemma 1 does not hold. The determination for updating the working set $W_k$ from (31) or (32) is based on how $X^k$ is computed, which is described in detail. In one aspect, the particular selection of $W_k$ is not critical to proving theoretical convergence results, and the prescriptions in (31), (32) are intended as practical guidance.

For any working set $W_k \subseteq \{1, \ldots, n\} \times \{1, \ldots, n\}$ and a matrix Y, define $Y_{W_k}$ coordinate-wise via $$(Y_{W_k})_{(i,j)} = \begin{cases} Y_{(i,j)} & \text{if } (i,j) \in W_k \\ 0 & \text{otherwise.} \end{cases}$$

Then, given a current iterate $X^k$, gradient $\nabla f(X^k)$, and Hessian $\nabla^2 f(X^k)$, solve the following reduced quadratic problem to obtain a Newton direction $D^k$:

$$\min_{D \in R^{n \times n}} q(D) \equiv \qquad (33)$$

$$tr(\nabla f(X^k)_{W_k} D_{W_k}) + \frac{1}{2} vec(D_{W_k})^T \nabla^2 f(X^k)_{W_k} vec(D_{W_k}).$$

To efficiently obtain an approximate solution of (33), an embodiment of a methodology of the present disclosure makes use of a conjugate gradient method. This conjugate gradient method takes advantage of the particular Kronecker product structure of $\nabla^2 f(X^k)$, as well as the observation that $|W_k| \ll n^2$, for instance, since the methodolgoy searches for a very sparse solution in applications.

A detailed description of our algorithm for solving (30) is given in Algorithm 1.

---

Algorithm 1: Reduced-space Projected Gradient Algorithm - RPGA($X^0$, $\Omega$, $\lambda$)

1  Choose parameters
   $\sigma \in (0,1), \delta > 0, \eta \in (0,1), \alpha_{min}^{Newton} > 0, [\alpha_{min}, \alpha_{max}] \subset (0, \infty)$,
   integers p,q such that $0 < p < q$, integerM > 0, grad_step = true .
2  Set k = 0.
3  while some stopping criteria not satisfied do
4    Step 1: Active-set Newton step
5    if (mod(k,q) ≠ p) then
6      if (grad_step = true) then
7        $W_k$ ← Eq. (31)
8      else
9        $W_k$ ← Eq. (32)
       /* end of if-then-else of line 6 */
10     Approximately solve for $D^k$ from (33)
11     Choose $\alpha_k = \alpha_{k,0} = 1$
12     j ← 0, ls ← true
13     while (ls = true) & ($\alpha_k \geq \alpha_{min}^{Newton}$) do
14       $\alpha_k \leftarrow \sigma^j \alpha_{k,0}$
15       $X_{trial}^{k+1} \leftarrow P_\Omega(X^k + \alpha_k D^k)$
16       if $\left(f(X^{k+1}) \leq f_{max}^k - \frac{\delta}{2}\|X^{k+1} - X^k\|_F^2 \text{ and } X^{k+1} \succ 0\right)$
         then
17         $X^{k+1} \leftarrow X_{trial}^{k+1}$
18         ls ← false
19       else
20         j ← j + 1
         /* end of if-then-else of line 16 */
       /* end of while loop of line 13 */
       /* end of if-then of line 5 */
21   Step 2: Gradient projection step
22   grad_step ← false
23   if (mod (k,q) = p) or ($\alpha_k < \alpha_{min}^{Newton}$) then
24     Choose $\alpha_{k,0} = \min(\alpha_{max}, \max(\alpha_{min}, \alpha_k^{BB}))$
25     j ← 0, ls ← true
26     while (ls = true) do
27       $\alpha_k \leftarrow \sigma^j \alpha_{k,0}$
28       $X_{trial}^{k+1} \leftarrow P_\Omega(X^k - \alpha_k \nabla f(X^k))$
29       if $\left(f(X^{k+1}) \leq f_{max}^k - \frac{\delta}{2}\|X^{k+1} - X^k\|_F^2 \text{ and } X^{k+1} \succ 0\right)$
         then
30         $X^{k+1} \leftarrow X_{trial}^{k+1}$
31         ls ← false
32       else
33         j ← j + 1 /* end of if-then-else of line 29 */
         /* end of while loop of line 26 */
34     grad_step ← true
       /* end of if statement of line 23 */
35   Step 3: Iterate
36   k ← k + 1
     /* end of whiile loop of line 3 */

---

Remark 1. As mentioned, $\Omega$ is a non-convex set, and as such, the operator $P_\Omega$ is generally set-valued, i.e. projections are non-unique. A point in $P_\Omega(X)$ can be quickly obtained. If $X \in R^{n \times n}$, set $X_{i,j} = 0$ for every $(i,j) \in \mathfrak{S}$. Then $P_\delta(X)$ is computed by sorting the $n^2$ many entries of |X|, where |•| denotes an entry-wise absolute value, and then replacing all but the κ largest values of |X| with 0, where ties could be broken arbitrarily. In order to attain a unique projection, when we compute $P_\Omega$, ties are not broken arbitrarily, but by a dictionary order on the matrix entries. The dictionary order is chosen in such a way to ensure that the projected matrix is symmetric. As a consequence of sorting $n^2$ matrix entries, the projection operation can be performed in $O(n^2 \log(n))$ time.

On each iteration of the backtracking procedure, one would compute an eigenvalue decomposition of the trial step $X^{k+1}$ both in order to compute the value of $\det(X^{k+1})$ in the objective function and to determine the satisfaction of (C2). Computing a determinant is generally an expensive operation. However, since a method in the present disclosure is explicitly searching for a positive definite matrix, it is enough to attempt a Cholesky factorization of $X^{k+1}$, which can be done more efficiently. If the factorization fails (a complex number appears on the diagonal of the lower triangular matrix), then the current $X^{k+1}$ is not positive definite and the method can immediately retract along the projection arc. If the factorization is successful, then the determinant of the matrix $X^{k+1}$ can be computed from the diagonal values of lower triangular matrix. This sequence of attempted Cholesky factorizations is repeated until the stopping criteria is satisfied. The finite termination in the backtracking step is proved below.

In an embodiment, performing a line search in the projected gradient direction in the full space may help a projected approximate Newton algorithm identify a good working set subspace, and enables proving of global convergence. Thus, in an embodiment, the general logic of Algorithm 1 is that, for fixed $q \in N$, after every q−1 iterations of Step 1 (the active-set Newton steps), the algorithm performs a single iteration of Step 2, the gradient projection step.

As in the case in nonconvex optimization, the iterates of Algorithm 1 need not converge to a global minimizer of (14), but only to a point satisfying necessary conditions for optimality. The difference between (14), which Algorithm 1 is to solve, and (3), the real problem of interest, lies in the $l_2$ regularization term. In an embodiment, a method of the present disclosure uses an outer homotopy method for solving (3). Algorithm 2 solves a sequence of subproblems of the form (14) by calling Algorithm 1, attempting to find increasingly better-quality minimizers. Two strictly decreasing sets of integer values $\kappa_0 > \kappa_1 > \ldots > \kappa_K = \kappa$ and real values $\lambda_0 > \lambda_1 > \ldots > \lambda_K = \lambda$ are selected before running the algorithm. A method of the present disclosure may first (approximately) solve (14) using a sparsity parameter $\kappa_0$, regularization parameter $\lambda_0$, and some initial point $X^0$. Then, the method may sequentially solve (14) to some tolerance for each pair $(\kappa_j, \lambda_j)$: $j=1, \ldots, K$, initializing each subproblem solve with the previous solution $X^{j-1}$. The final regularization parameter $\lambda_K$ should be quite small in practice.

---

Algorithm 2: Projected Gradient Newton Algorithm with Warm Starts - PPNA

1 Choose homotopy sequence $\{(\kappa_j, \lambda_j): j = 0,1,2,\ldots, K\}$, initial point $X^0$.
2 for $j = 0,1,\ldots,K$ do
3    $\Omega_j \leftarrow \{X: \|X\|_0 \le \kappa_j, X_{i,j} = 0 \ \forall (i,j) \in \mathfrak{I}\}$
4    $X^{j+1} \leftarrow \text{RPGA}(X^j, \Omega_j, \lambda_j)$
   /* end of for loop of line 2 */

---

Convergence Analysis

This section provides a proof that the iterates of Algorithm 1 for solving problem (14) accumulate at a point satisfying the necessary optimality conditions (27). It may be assumed that the initial point $X^0$ is feasible with respect to the constraints of (14).

The following states an assumption on $\kappa$:

Assumption 1. Assume that $\kappa$ in (14) (and (15)) is an integer satisfying $\kappa \in [n, n^2)$. Observe that this assumption is reasonable, since as demonstrated earlier, n is a sufficient condition for (15) to have a non-empty feasible set, and if $\kappa = n^2$, then the problem reduces to a convex one. It is demonstrated that the line search in either Step 1 (the active-set Newton step) or Step 2 (the gradient projection step) terminates in a finite number of iterations.

Lemma 2. Suppose that problem (14) satisfies Assumption 1. Let $\{X^k\}$ denote the sequence of iterates generated by Algorithm 1 for solving problem (14). Suppose the line search starting in either Line 13 or Line 26 of Algorithm 1 is reached in the k-th iteration and suppose $X^k$ is feasible with respect to the constraints of (14). Then, the line search in steps 1 and 2 terminates in a finite number of iterations.

Proof 5. The line search in Step 1 terminates in a finite number of iterations because the termination condition $\alpha_k < \alpha_{min}^{Newton}$ is enforced. The following proves the finite termination when the line search occurs in Step 2 (the gradient projection step). Assume $\nabla f(X^k) \neq 0$, since otherwise the algorithm stops a local solution $X^k$.

There exists $T_p^k > 0$ such that every matrix in $P_\Omega(X^k - t\nabla f(X^k))$ is positive definite for all $t \in (0, T_p^k)$. For a nonzero symmetric matrix U, denote the spectral norm of U by $\|U\|_2 \triangleq \max(|\sigma_{min}(U)|, |\sigma_{max}(U)|) > 0$, where $\sigma_{min}(U), \sigma_{max}(U)$ denote the smallest and largest eigenvalues of U, respectively. Thus, for all $t \in (0, L_1)$, there is $X^k + tU \succ 0$, where there is defined $$L_1 = \frac{\sigma_1(X^k)}{\|U\|_2}.$$

Given $X^k$, let I and A denote respectively the inactive and active matrix indices of $X^k$ with respect to the cardinality constraint, i.e.:

$$I \triangleq \{(i,j): X_{i,j}^k \neq 0\}$$

$$A \triangleq \{(i,j): X_{i,j}^k = 0\}.$$

Additionally define $$(i_x, j_x) \triangleq \arg\min_{(i,j) \in I} |X_{i,j}^k|$$

$$(i_{g,n}, j_{g,n}) \triangleq \arg\max_{(i,j) \in I} |(\nabla f(X^k))_{i,j}|$$

$$(i_{g,a}, j_{g,a}) \triangleq \arg\max_{(i,j) \in A} |(\nabla f(X^k))_{i,j}|.$$

The following demonstrates the existence of the necessary $T_p^k > 0$ by analyzing two separate cases concerning the cardinality of the set of inactive indices, $|I|$.

Case 1. ($|I| = \kappa$): For every $(i, j) \in I$ there is $$|X_{i,j}^k - t(\nabla f(X^k))_{i,j}| \ge |X_{i,j}^k| - t|(\nabla f(X^k))_{i,j}| \ge |X_{i_x,j_x}^k| - t|(\nabla f(X^k))_{i_{g,n},j_{g,n}}|.$$

Defining $$T_1^k = \frac{|X_{i_x,j_x}^k|}{|(\nabla f(X^k))_{i_{g,n},j_{g,n}}| + |(\nabla f(X^k))_{i_{g,a},j_{g,a}}|},$$

it is concluded from (34) that for all $(i, j) \in I$, $$|X_{i,j}^k - t(\nabla f(X^k))_{i,j}| > t|(\nabla f(X^k))_{i_{g,a},j_{g,a}}| \ge t|(\nabla f(X^k))_{h,l}|, \quad (34)$$

for all $(h,l) \in A$ and $t \in (0, T_1^k)$. Note that $T_1^k$ is well-defined since $|X_{i_x,j_x}^k|$ and $|(\nabla f(X^k))_{i_{g,n},j_{g,n}}| + |(\nabla f(X^k))_{i_{g,a},j_{g,a}}|$ are strictly positive. It is possible to decompose $$X^k - t\nabla f(X^k) = [X^k - t\nabla f(X^k)]_I + [X^k - t\nabla f(X^k)]_A = [X^k - t\nabla f(X^k)]_I - t[\nabla f(X^k)]_A.$$

Combining this decomposition with Remark 1 and (34), it follows that $$[X^k - t\nabla f(X^k)]_I = P_\Omega(X^k - t\nabla f(X^k)) \text{ for } t \in (0, T_1^k).$$

Now consider $U = [\nabla f(X^k)]_I$, and define $$T_2^k \triangleq \begin{cases} \frac{\sigma_1(X^k)}{\|U\|_2} & \text{if } U \neq 0 \\ 1 & \text{otherwise} \end{cases}$$

Then, letting $$T_p^k = \min(T_1^k, T_2^k),$$

not only is $X^k - t[\nabla f(X^k)]_I = P_\Omega(X^k - t\nabla f(X^k))$, but also $X^k - t[\nabla f(X^k)]_I$ is positive definite for any $t \in (0, T_p^k)$.

Case 2. ($|I| < \kappa$): Denote by $\hat{A} \subseteq A$ the set of indices $(i, j) \in A$ corresponding to the $\kappa - |I|$ largest absolute magnitude entries of $[\nabla f(X^k)]_A$.

Denote $$(i_{g,a'}, j_{g,a'}) \triangleq \arg\max_{(i,j) \in A \setminus \hat{A}} |(\nabla f(X^k))_{i,j}|.$$

Define $$T_3^k = \frac{|X_{i_x,j_x}^k|}{|(\nabla f(X^k))_{i_g,n,j_g,n}| + |(\nabla f(X^k))_{i_g,a',j_g,a'}|}.$$

From (34), it follows that $$|X_{i,j}^k + t(\nabla f(X^k))_{i,j}| > t|(\nabla f(X^k))_{i_g,a,j_g,a}| \geq t|(\nabla f(X^k))_{k,h}|, \quad (35)$$

for all $(i, j) \in I, (k,h) \in A\backslash \hat{A}$ and $t \in (0, T_3^k)$. Similarly to Case 1, it is possible to decompose $$X^k - t\nabla f(X^k) = [X^k - t\nabla f(X^k)]_I + [X^k - t\nabla f(X^k)]_{\hat{A}} + [X^k - t\nabla f(X^k)]_{A\backslash \hat{A}}$$

$$= [X^k - t\nabla f(X^k)^k]_I - t[\nabla f(X^k)]_{\hat{A}} - t[\nabla f(X^k)]_{A\backslash \hat{A}}.$$

From this decomposition, Remark 1, and (35), there is $[X^k - t\nabla f(X^k)]_{I \cup \hat{A}} \in P_\Omega(X^k - t\nabla f(X^k))$ for $t \in (0, T_3^k)$. Define $U = [\nabla f(X^k)]_{I \cup \hat{A}}$, and analogous to the definition of $T_2^k$ in Case 1, define $$T_4^k \triangleq \begin{cases} \frac{\sigma_1(X^k)}{\|U\|_2} & \text{if } U \neq 0 \\ 1 & \text{otherwise} \end{cases}$$

Choose $$T_p^k = \min(T_3^k, T_4^k).$$

It is concluded that for any $t \in (0, T_p^k)$, there is both $X^k - t[\nabla f(X^k)]_{I \cup \hat{A}} \in P_\Omega(X^k - t\nabla f(X^k))$ and $X^k - t[\nabla f(X^k)]_{I \cup \hat{A}}$ is positive definite. Since every matrix in $P_\Omega(X^k - t\nabla f(X^k)^k)$ can be represented as $X^k - t[\nabla f(X^k)]_{I \cup \hat{A}}$, the existence of the needed $T_p^k$ is proven.

The following proves that there exists a positive number $T_\delta > 0$, independent of k, such that $$f(X^{k+1}) \leq f_{max}^k - \frac{\delta}{2}\|X^{k+1} - X^k\|_F^2 \text{ provided } t \in (0, T_\delta), \quad (36)$$

where $X^{k+1} = P_\Omega(X^k - t\nabla f(X^k))$ and suppose that $$f(X^k) \leq f_{max}^{k-1} - \frac{\delta}{2}\|X^k - X^{k-1}\|^2.$$

Here, the notion $X^{-1} = X^0$ and $f_{max}^{-1} = f(X^0)$ is adopted. Define $$L = \{X \in R^{n \times n} : f(X) \leq f(X^0)\}.$$

Note that $f(X^k) \leq f_{max}^{k-1} \leq f(X^0)$, thus $X^k \in L$. Replacing $X^*$ and $\overline{X}$ by X and $X^0$ respectively in (18) and (20) yields $L \cup \{X \in R^{n \times n}: \underline{\sigma} I_n \succeq X \succeq \overline{\sigma} I_n\}$, where $\underline{\sigma}$ and $\overline{\sigma}$ are some constants satisfying $0 < \underline{\sigma} \leq \overline{\sigma} < \infty$. Define $$K = \{X \in R^{n \times n} : 0.5\underline{\sigma} I_n \preceq X \preceq (\overline{\sigma} + 0.5\underline{\sigma})I_n\}. \quad (37)$$

There is $L \subset K$. Since $X^{k+1}$ minimizes $h_{t,I_n,X^k}(Z)$, it follows $$h_{t,I_n,X^k}(X^{k+1}) = tr(\nabla f(X^k)^T(X^{k+1} - X^k)) + \frac{1}{2t}\|X^{k+1} - X^k\|_F^2$$

$$\leq h_{t,I_n,X^k}(X^k) = 0.$$

Obtain $$\|X^{k+1} - X^k\|_F^2 \leq 2t\,tr(\nabla f(X^k)^T(X^k - X^{k+1}))$$

Taking norms yields $$\|X^{k+1} - X^k\|_F \leq 2t\|\nabla f(X^k)\|_F = 2t\|S - (X^k)^{-1} + \lambda X^k\|_F$$

Since $X^k$ lies in the compact set K, there exists a constant c, independent of $X^k \in K$, such that $$\|\nabla f(X^k)\|_F = \|S - (X^k)^{-1} + \lambda X^k\|_F \leq c.$$

Choose $\beta \in (0, \infty)$ so that $2\delta c \leq 0.5\underline{\sigma}$. $X^{k+1} \in K$ when $t \leq \beta$ and $X^k \in L$. Indeed, there is $$\sigma_{min}(X^{k+1}) \geq \sigma_{min}(X^k) - \sigma_{max}(X^{k+1} - X_k)$$

$$= \sigma_{min}(X^k) - \|X^{k+1} - X^k\|_2$$

$$\geq \underline{\sigma} - \frac{\|X^{k+1} - X^k\|_F}{\sqrt{n}}$$

$$\geq \underline{\sigma} - \frac{\underline{\sigma}}{2\sqrt{n}} > 0.5\underline{\sigma} \text{ (since}\|X^{k+1} - X^k\|_F \leq 0.5\underline{\sigma})$$

Furthermore, there is $$\sigma_{max}(X^{k+1}) \leq \sigma_{max}(X^k) + \sigma_{max}(X^{k+1} - X^k)$$

$$\leq \overline{\sigma} + \|X^{k+1} - X^k\|_F$$

$$\leq \overline{\sigma} + 0.5\underline{\sigma}.$$

Hence it is concluded that $X^{k+1} \in K$. Because the eigenvalues of any matrix in K are bounded, f is Lipschitz continuously differentiable on K. Denote $L_f$ by the Lipschitz constant for f on K. In view of the convexity of K, the line segment connecting $X^k$ and $X^{k+1}$ is contained in K. There is $$f(X^{k+1}) \leq f(X^k) + tr(\nabla f(X^k)^T(X^{k+1} - X^k)) + \frac{1}{2L_f}\|X^{k+1} - X^k\|_F^2$$

$$\leq f(X^k) - \left(\frac{1}{2t} - \frac{1}{2L_f}\right)\|X^{k+1} - X^k\|_F^2$$

$$\leq f_{max}^k - \left(\frac{1}{2t} - \frac{1}{2L_f}\right)\|X^{k+1} - X^k\|_F^2$$

$$\leq f_{max}^k - \frac{\delta}{2}\|X^{k+1} - X^k\|_F^2 \text{ if } \delta \leq \frac{1}{t} - \frac{1}{L_f}.$$

Define $$T_\sigma = \min\left(\frac{\underline{\sigma}}{4c}, \frac{L_f}{\delta L_f + 1}\right),$$

then there is $$f(X^{k+1}) \leq f_{max}^{k-1} - \frac{\delta}{2}\|X^{k+1} - X^k\|_F^2 \text{ provided } t \in [0, T_\delta), \quad (38)$$

i.e., the sufficient decrease condition in Line 29 holds for all $t \in [0, T_\delta^k)$. Thus, letting $T_p^k$ be the appropriate $T_p^k$ from either Case 1 or Case 2, and letting $\sigma$ and $\alpha_{k,0}$ be taken from Algorithm 1, it is concluded that within $$\left\lceil \log_\sigma\left(\frac{\min\{T_p^k, T_\delta\}}{\alpha_{k,0}}\right) \right\rceil$$

iterations, $X^{k+1}$ will satisfy both of the stopping criteria of the line search.

Lemma 3. Suppose that problem (14) satisfies Assumption 1. Let $\{X^k\}$ denote the sequence of iterates generated by Algorithm 1 for (14). Then, $\|X^{k+1} - X^k\| \to 0$. Moreover, the sequence $\{f(X^k)\}$ admits a limit point $f^*$.

Proof 6. If $\nabla f(X^k) = 0$ for any k, then the lemma is immediate. So, assume $\nabla f(X^k) \neq 0$ for every k. Due to the stopping criteria for the line-search in Lines 16 and 28 of Algorithm 1, there is $f(X^{k+1}) \leq f_{max}^k$ for all k. Thus, $f_{max}^{k+1} \leq f_{max}^k$ for all k. The sequence $\{f_{max}^k\}$ is monotone decreasing and bounded from below, hence there exists a limit point $\{f_{max}^k\} \to f^*$. Since f is uniformly continuous on the level set $L \subset \{X : \underline{\sigma}I_n \succeq X \succeq \overline{\sigma}I_n\}$, an induction argument can be used to conclude that $\|X^{k+1} - X^k\| \to 0$.

Theorem 4. Suppose that problem (14) satisfies Assumption 1. Let $\{X^k\}$ denote the sequence of iterates generated by Algorithm 1 for (14). If $X^*$ is an accumulation point of $\{X^k\}$, then $X^*$ satisfies the necessary optimality conditions stated in Lemma 1, i.e. there exists $T > 0$ such that (27) holds.

Proof 7. Again, assume $\nabla f(X^k) \neq 0$ for every k, since otherwise the theorem is immediate. Since $X^*$ is an accumulation point of $\{X^k\}$, there exists a subsequence of indices $\{k_i\}_{i=0, 1, 2, \ldots}$ such that $$\lim_{i \to \infty} X^{k_i} = X^*.$$

By the definition or limit, for a sufficiently large $\overline{k}$, the positions of the nonzero entries of $X^{k_i}$ are the same for $k_i > \overline{k}$, and their magnitudes are uniformly bounded away from zero. In Lemma 2, it was proven that $X^k \in L \in \{\underline{\sigma}I_n \succeq X \succeq \overline{\sigma}I_n\}$ for all k, the largest eigenvalue of $\nabla f(X^k) = S - (X^k)^{-1} + \lambda X^k$ is bounded from above for all k. Thus, reusing the definition of $T_p^k$ from the proof of Lemma 2 for either Case 1 or Case 2, there exists a constant $T_p > 0$ such that $T_p^{k_i} \geq T_p$ for all $k_i > \overline{k}$. So, the step-size $\alpha_{k_i}$ taken at the end of the $k_i$-th iteration is lower-bounded as $$\alpha_{k_i} \geq \alpha_{k_i,0} \sigma^{\left\lceil \log_\sigma\left(\frac{\min\{T_p, T_\delta\}}{\alpha_{k_i,0}}\right) \right\rceil}$$

and so there exists $\overline{\alpha} > 0$ such that $$\lim_{i \to \infty} \alpha^{k_i} \geq \overline{\alpha},$$

since there are bounds $\alpha_{min} \leq \alpha_{k_i,0} \leq \alpha_{max}$ as algorithmic parameters. Take any T such that $0 < T < \min(\overline{\alpha}, T_p)$. Consider two possible cases for the subsequence $\{X^{k_i+1}\}$:

Case 1: Suppose that infinitely many iterates in $\{X^{k_i+1}\}_{i=0, 1, \ldots}$ are generated in Step 2 (the gradient projection step). Then, without loss of generality, it can be assumed that the entire subsequence $\{X^{k_i+1}\}_{i=0, 1, \ldots}$ is generated in Step 2. By triangle inequality, there is $$\lim_{i \to \infty} \|X^{k_i+1} - X^*\|_F \leq \lim_{i \to \infty} \|X^{k_i+1} - X^{k_i}\|_F + \lim_{i \to \infty} \|X^{k_i} - X^*\|_F,$$

and so it is concluded from Lemma 3 and the choice of subsequence $\{k_i\}$ that $$\lim_{i \to \infty} X^{k_i+1} = X^*.$$

For any $t > 0$, let $Y^{k_i} \in S_{t,I_n}(X^{k_i})$. It follows from the definition of $S_{t,I_n}$ that $$tr\left(\nabla f(X^{k_i})^T(X^{k_i+1} - X^{k_i})\right) + \frac{1}{2t}\|X^{k_i+1} - X^{k_i}\|_F^2 \geq \quad (39)$$
$$tr\left(\nabla f(X^{k_i})^T(Y^{k_i} - X^{k_i})\right) + \frac{1}{2t}\|Y^{k_i} - X^{k_i}\|_F^2.$$

Since $$X^{k_i+1} \in S_{\alpha_{k_i}, I_n}(X^{k_i})$$

for all $k_i$, there also is from the definition of $$S_{\alpha_{k_i}, I_n}$$

that $$tr\left(\nabla f(X^{k_i})^T(Y^{k_i} - X^{k_i})\right) + \frac{1}{2\alpha_{k_i}}\|Y^{k_i} - X^{k_i}\|_F^2 \geq \quad (40)$$
$$tr\left(\nabla f(X^{k_i})^T(X^{k_i+1} - X^{k_i})\right) + \frac{1}{2\alpha_{k_i}}\|X^{k_i+1} - X^{k_i}\|_F^2$$

Combining (39) and (40), then, it is obtained for any $t > 0$ $$tr\left(\nabla f(X^{k_i})^T(X^{k_i+1} - X^{k_i})\right) + \frac{1}{2t}\|X^{k_i+1} - X^{k_i}\|_F^2 \geq \quad (41)$$
$$tr\left(\nabla f(X^{k_i})^T(X^{k_i+1} - X^{k_i})\right) +$$
$$\frac{1}{2\alpha_{k_i}}\|X^{k_i+1} - X^{k_i}\|_F^2 + \left(\frac{1}{2t} - \frac{1}{2\alpha_{k_i}}\right)\|Y^{k_i} - X^{k_i}\|_F^2.$$

If $t \in (0, T)$, then it may be concluded from (42) that $$\lim_{i \to \infty} \|Y^{k_i} - X^{k_i}\|_F = 0,$$

since $$\lim_{i\to\infty}\|X^{k_i+1} - X^{k_i}\|_F = 0$$

by Lemma 3 and since $$\frac{1}{2t} - \frac{1}{2\alpha_{k_i}} > 0$$

by the choice of t. By triangle inequality, $$\lim_{i\to\infty}\|Y^{k_i} - X^*\|_F \le \lim_{i\to\infty}\|Y^{k_i} - X^{k_i}\|_F + \lim_{i\to\infty}\|X^{k_i} - X^*\|_F,$$

and hence $$\lim_{i\to\infty} Y^{k_i} \to X^*.$$

So, using Proposition 1, it is concluded that $X^* \in P_\Omega(X^* - t\nabla f(X^*))$ for all $t \in (0, T)$.

Case 2: Suppose that only finitely many elements of the subsequence $\{X^{k_i+1}\}$ are generated in Step 2. Then, without loss of generality, it can be assumed that every iterate of the subsequence $\{X^{k_i+1}\}_{i=0, 1, \ldots}$ is generated in Step 1. By the pigeonhole principle, there exists an integer $m \in [0, p)$ such that $\mathrm{mod}(k_i+1,q)=m$ for infinite many $k_i$. Hence one has $\mathrm{mod}(k_i+1+p-m,q)=p$ for infinite many $k_i$; that is, every iterate of the subsequence $\{X^{k_i+1+p-m}\}$ is generated in Step 2. From the triangle inequality, $$\lim_{i\to\infty}\|X^{k_i+1+p-m} - X^*\|_F \le \lim_{i\to\infty}\sum_{j=0}^{p-m}\|X^{k_i+j+1} - X^{k_i+j}\|_F + \lim_{i\to\infty}\|X^{k_i} - X^*\|_F,$$

and so by Lemma 3 and the choice of the subsequence $\{X^{k_i}\}$, $X^{k_i+1+p-m} \to X^*$. From here, the same argument as in Case 1 can be applied to the subsequence $\{X^{k_i+1+p-m}\}$ to get $X^* \in P_\Omega(X^*-t\nabla f(X^*))$ for all $t \in (0, T)$.

It now only remains to prove the uniqueness of $P_\Omega(X^*-t\nabla f(X^*))$, show that $X^*=P_\Omega(X^*-t\nabla f(X^*))$ as a set equality. Two separate cases are analyzed:

Case A. ($|I(X^*)|=\kappa$): Assume that $Z^* \in P_\Omega(X^*-t\nabla f(X))$ for all $t \in (0,T)$. Towards a contradiction, suppose that $Z^* \ne X^*$ for some $t' \in (0, T)$. By the definition of $P_\Omega$, it is concluded that because $Z^* \ne X^*$, $|X_{i',j'}^*| \le |Z_{l',m'}^*(t')|$, where there is defined $$|X^{i'j'*}| \triangleq \mathrm{argmin}\{|X_{u,v}^*|:(u,v) \in I(X^*)\}$$

and $$|Z_{l^*,m}^*(t)| \triangleq \mathrm{argmax}\{|(X^*-t\nabla f(X^*))_{u,v}|:(u,v) \in A(X^*)\}.$$

This implies that $(\nabla f(X^*))_{l',m'}=0$, since otherwise there exists $\tilde{t} \in (0,T)$ such that $|(X^*-\tilde{t}\nabla f(X^*))_{l',m'}| > |X_{i',j'}^*|$, which would contradict $X^* \in P_\Omega(X^*-\tilde{t}\nabla f(X^*))$, since $(i', j') \in I(X^*)$ and $(l', m') \in A(X^*)$. But, if $(\nabla f(X^*))_{l',m'}=0$, then $X^* \notin (X^*-t\nabla f(X^*))$ for any $t \in (0,T)$, since $(X^*-t\nabla f(X^*))_{l',m'}=(X^*)_{l',m'}$, and $(l',m') \in A(X^*)$. This is a contradiction.

Case B. ($|I(X^*)|<\kappa$): If $(\nabla f(X^*))_{i,j} \ne 0$ for some $(i, j) \in A(X^*)$, then there exists $\tilde{t} \in (0,T)$ such that $|(X^*-\tilde{t}\nabla f(X^*))_{i,j}| \ne 0$; hence $X^* \notin P_\Omega(X^*-\tilde{t}\nabla f(X^*))$, which would be a contradiction. Thus, it is the case that $[\nabla f(X^*)]_{A(X^*)^*}=0$. Consider the reduced projection problem over the inactive indices in $I(X^*)$, $$\min_{Y_{i,j}} \sum_{(i,j)\in I(X^*)} (Y_{i,j} - (X^* - t\nabla f(X^*))_{i,j})^2. \quad (42)$$

Since $H_{i,j}^*$ is a solution to (42), it is derived that $[\nabla f(X^*)]_{I(X^*)}=0$; thus it is concluded that $\nabla f(X^*)=0$, and so it follows that $X^*=P_\Omega(X^*-t\nabla f(X^*))$ for any $t \in (0,T)$.

The following result further shows that any accumulation point produced by Algorithm 1 is a strict local minimizer of (14).

Theorem 5. Any accumulation point $X^*$ of $\{X^k\}_{k=0, 1, \ldots}$ generated by Algorithm 1 is a strict local minimizer of (14).

Proof 8. It may be proven that there exists $\varepsilon > 0$ such that for all $Y$ so that $X^*+Y$ is feasible with respect to the constraints of (14) and $\|Y\|_F \in (0,\varepsilon)$, it holds that $f(X^*+Y) > f(X^*)$. From Theorem 4, there exists $T > 0$ such that $X^*=P_\Omega(X^*-t\nabla f(X^*))$ for all $t \in (0,T)$. Equivalently, for all such t, the matrix 0 is the unique global minimizer of $$\arg\min_{Y: X^*+Y \in \Omega} g_t(Y) \triangleq f(X^*) + tr(\nabla f(X^*)Y) + \frac{1}{2t}\|Y\|_F^2.$$

Moreover, f is strongly convex on $K=\{x: 0.5\underline{\sigma}I_n \circ X \circ (\overline{\sigma}+0.5\underline{\sigma})I_n\}$ defined in (37). Denote $\rho$ by the strong convexity constant. Note that $X^k \in L \subset \{\underline{\sigma}I_n \circ X \circ \overline{\sigma}I_n\}$, hence the limit $X^* \in \{\underline{\sigma}I_n \succeq X \succeq \overline{\sigma}I_n\}$. In Lemma 2, it was proven that if $\|Y\|_F \le 0.5\underline{\sigma}$ then $X^*+Y \in K$. For any $\|Y\|_F \le 0.5\underline{\sigma}$, there is $$f(X^* + Y) \ge f(X^*) + tr(\langle \nabla f(X^*), Y \rangle) + \frac{1}{2\rho}\|Y\|_F^2 \quad (43)$$

$$= f(X^*) + \frac{1}{2\rho}\|Y + \rho\nabla f(X^*)\|_F^2 - \frac{\rho}{2}\|\nabla f(X^*)\|_F^2,$$

where the equality is by completing the square. As in the proof of Theorem 4, the analysis may be split into two cases.

Case A ($|I(X^*)|=\kappa$): Observe that there is $Y_{i,j}=0$ for every $(i, j) \in A(X^*)$, in order for $X^*+Y \in \Omega$ to hold in an arbitrarily small neighborhood of $X^*$. Also observe that $(\nabla f(X^*))_{i,j}=0$ for every $(i, j) \in I(X^*)$; otherwise, $X^* \notin P_\Omega(X^*-t\nabla f(X^*))$ for sufficiently small t, which would yield a contradiction. Taking $$\varepsilon < \min\{0.5\underline{\sigma}, \min\{|X_{i,j}^*|:(i,j) \in I(X^*)\}\}, \quad (44)$$

there is $X^*+Y \succ 0$ since $0.5\underline{\sigma} < \sigma_1(X^*)$. From (43), it is obtained $$f(X^* + Y) \ge f(X^*) + \frac{1}{2\rho}\sum_{(i,j)\in I(X^*)}(Y_{i,j} + \rho(\nabla f(X^*))_{i,j})^2 +$$

$$\frac{1}{2\rho}\sum_{(i,j)\in A(X^*)}(Y_{i,j} + \rho(\nabla f(X^*))_{i,j})^2 -$$

$$\frac{\rho}{2}\sum_{(i,j)\in I(X^*)}((\nabla f(X^*))_{i,j})^2 -$$

-continued $$\frac{\rho}{2} \sum_{(i,j) \in A(X^*)} ((\nabla f(X^*))_{i,j})^2$$

$$= f(X^*) + \frac{1}{2\rho} \sum_{(i,j) \in I(X^*)} Y_{i,j}^2 +$$

$$\frac{1}{2\rho} \sum_{(i,j) \in A(X^*)} (\rho(\nabla f(X^*))_{i,j})^2 -$$

$$\frac{\rho}{2} \sum_{(i,j) \in A(X^*)} ((\nabla f(X^*))_{i,j})^2$$

$$= f(X^*) + \frac{1}{2\rho} \sum_{(i,j) \in I(X^*)} Y_{i,j}^2$$

$$> f(X^*),$$

where the last strict inequality comes from the fact that not all the entries of Y are 0.

Case B. ($|I(X^*)| < \kappa$): As in the proof of Case B in Theorem 4, there is $\nabla f(X^*) = 0$. Hence from (43), there is $$f(X^* + Y) \geq f(X^*) + \frac{1}{2\rho} \|Y\|_F^2 > f(X^*),$$

for any $\|Y\|_F \leq \varepsilon$ ($\varepsilon$ defined in (44)), which completes the proof.

In one aspect, the number of nonzeros κ and the coefficient λ that penalizes the Frobenius norm may be tuned. In one aspect, it is noted that the performance of the model of Equation (3), for example, evaluated based on real data, is stable for a wide range of parameters κ and λ.

A system and/or method in embodiments provide for anomaly localization for multivariate time series datasets. An $l_0$-constrained model with an $l_2$-regularization in an objective function in one embodiment learns sparse dependency graphs, e.g., creates a dependency graph structure. In an embodiment, a projected gradient algorithm for the $l_0$-constrained problem is developed and proved that it converges to a stationary point. In embodiments, metrics are applied for scoring anomalies. An $l_2$-regularized $l_0$-constrained models of Equation (3) and Equation (4), for example, combined with a metric, e.g., the conditional expected Kullback-Liebler divergence anomaly scoring of Equation (8), improves methods for detecting anomalies.

Figure 3:
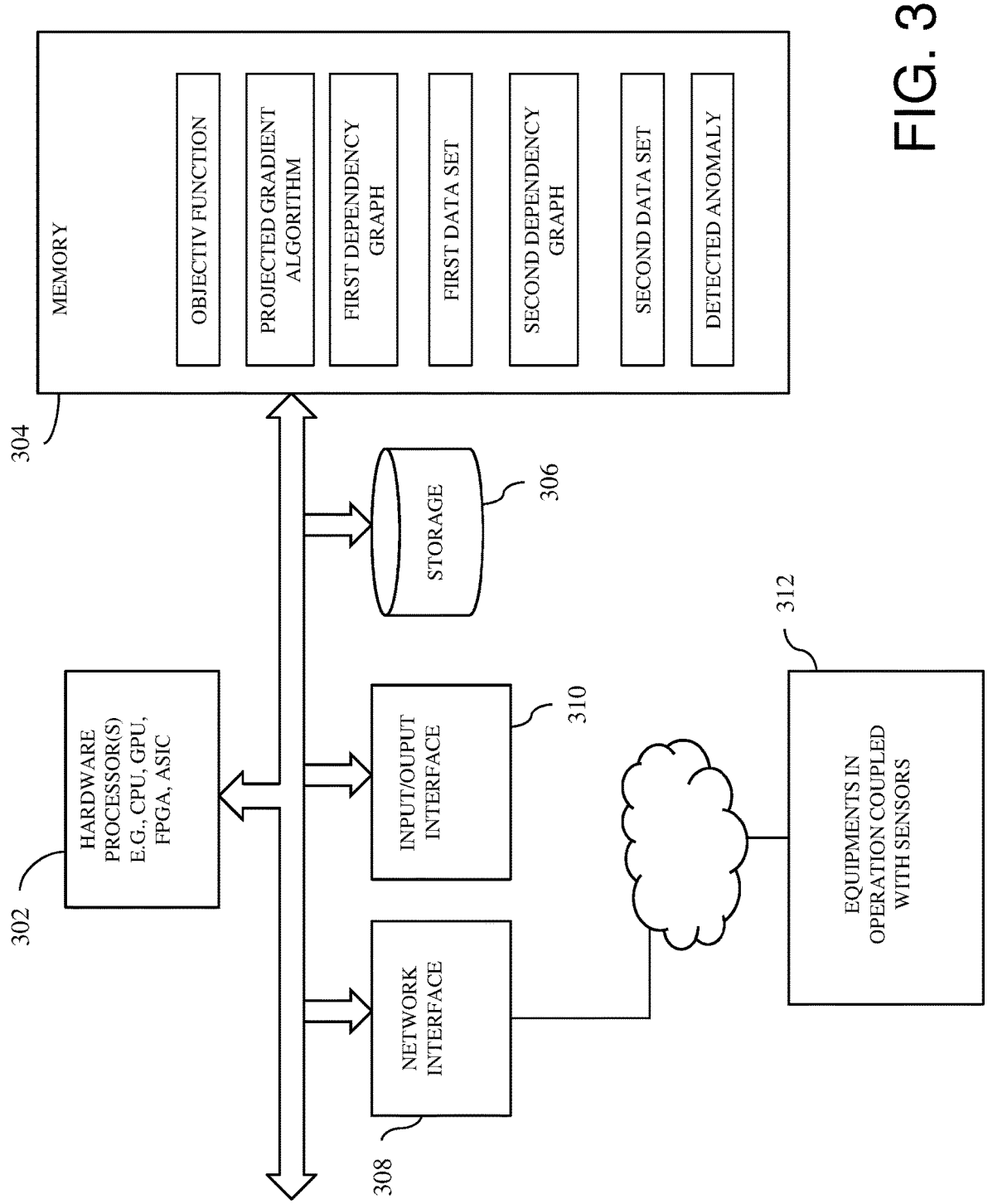
FIG. 3 is a diagram showing components of a system in one embodiment, which performs localization for multivariate time series datasets detects anomalies in sensor data.

FIG. 3 is a diagram showing components of a system in one embodiment, which performs localization for multivariate time series datasets detects anomalies in sensor data. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and constructs a first dependency graph based on a first data set by solving a first objective function constrained with a maximum number of non-zeros and formulated with a regularization term, which includes a quadratic penalty to control sparsity. In an embodiment, the quadratic penalty is determined as a function of the first data set in constructing the first dependency graph. One or more hardware processors 302 also constructs a second dependency graph based on the second data set by solving the first objective function constrained with the maximum number of non-zeros and formulated with the regularization term, which includes a quadratic penalty. In constructing the second dependency graph, the quadratic penalty is determined as a function of the first data set and the second data set.

In an embodiment, one or more hardware processors 302 receive via a communication or network interface 308, a first data set, which includes sensor data detected by a plurality of sensors coupled to equipments in operation during a first period of time, for example, shown at 312. During this first period of time, the equipments are considered to have functioned in normal manner (e.g., without particular errors or malfunctioning), and hence the first data set includes data associated with normal state of operations of the equipments. One or more hardware processors 302 also receive a second data set comprising sensor data detected by the plurality of sensors coupled to the equipments 312 in operation during a second period of time. The second period of time may be the current time, for example, a window of current time. One or more hardware processors 302 determines an anomaly score for each of the plurality of sensors based on comparing the first dependency graph and the second dependency graph.

One or more hardware processors 302, in an embodiment, responsive to determining that an anomaly score associated with a sensor in the plurality of sensors meets a threshold value indicative of abnormal functioning, automatically triggers a corrective action to correct an equipment coupled to the sensor. For instance, one or more hardware processors 302 may send a signal to adjust one or more parameters of one or more equipments 312, via a network interface 308.

In an embodiment, one or more hardware processors 302 solve the first object function implementing a projected gradient algorithm. The projected gradient algorithm embeds an approximate Newton method, wherein feasibility with respect to sparsity constraint is handled via projection, and a symmetric positive-definiteness of iterates is ensured through a line-search procedure.

The memory device 304 may include random access memory (RAM), read-only memory (ROM) or another memory device, and may store data and/or processor instructions for implementing various functionalities associated with the methods and/or systems described herein. A processor 302 may execute computer instructions stored in the memory 304 or received from another computer device or medium. The memory device 304 may, for example, store instructions and/or data for functioning of the one or more hardware processors 302, and may include an operating system and other program of instructions and/or data. In one aspect, input data such as the first data set and the second data set, and program instructions which one or more of the hardware processors 302 may execute, can be stored on a storage device 306 or received via a network interface 308 from a remote device, and may be temporarily loaded into the memory device 304 to construct dependency graphs and detect anomaly. One or more hardware processors 302 may be coupled with interface devices such as a network interface 308 for communicating with remote systems, for example, via a network, and an input/output interface 310 for communicating with input and/or output devices such as a keyboard, mouse, display, and/or others.

Figure 4:
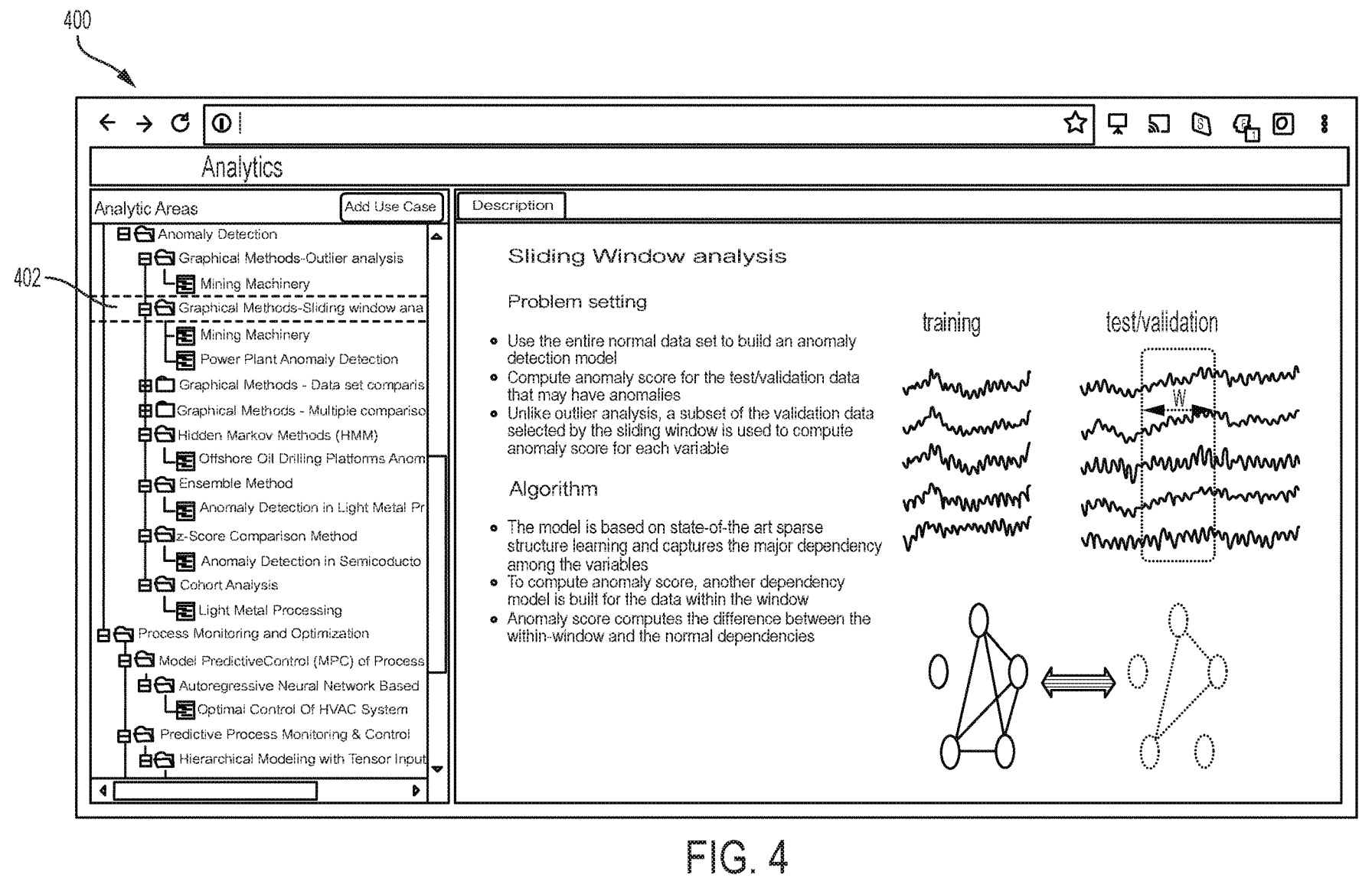

FIG. 4 is a diagram illustrating a screen display of an analytics tool in an embodiment, which integrate anomaly detection technique in one embodiment. Learning dependency models and detecting anomalies according to embodiments in the present disclosure can be integrated as an analytics function, for example, shown at 402, which can be selectable via a user interface 400 of an analytics tool. Selecting the function 402, for example, navigates a user through building of dependency graphs and detecting anomalies in connected sensor network, for example, of equipments in operation, for example, in a manufacturing or another industrial process.

Figure 5:
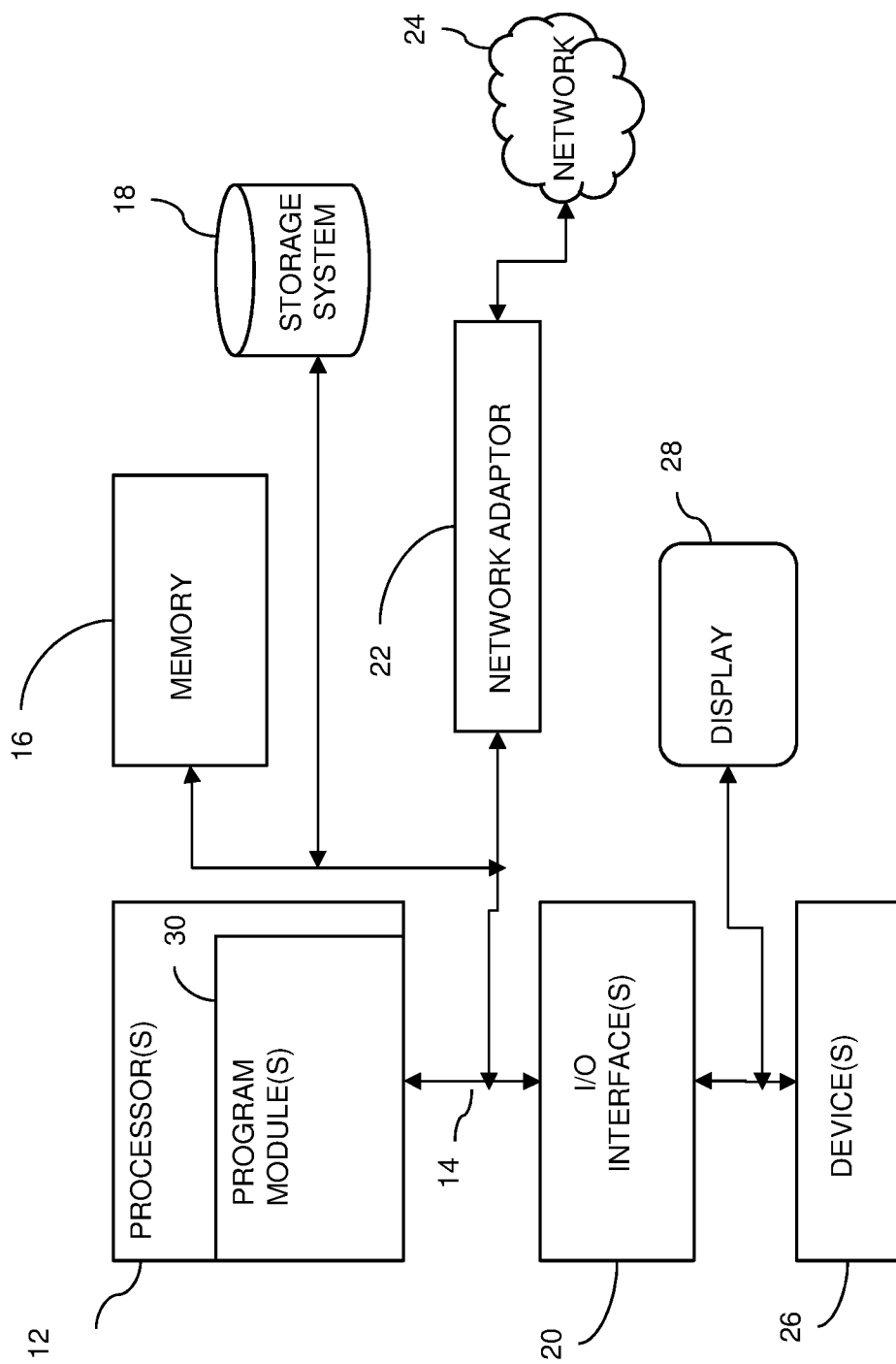
FIG. 5 illustrates a schematic of an example computer or processing system that may implement a system in one embodiment of the present disclosure.

FIG. 5 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving a first data set comprising sensor data detected by a plurality of sensors coupled to equipments in operation during a first period of time;
constructing a first dependency graph based on the first data set by solving a first objective function constrained with a maximum number of non-zeros and formulated with a regularization term comprising a first quadratic penalty to control sparsity, wherein the first quadratic penalty is determined as a function of the first data set in constructing the first dependency graph;
receiving a second data set comprising sensor data detected by the plurality of sensors coupled to the equipments in operation during a second period of time;
constructing a second dependency graph based on the second data set by solving the first objective function constrained with the maximum number of non-zeros and formulated with the regularization term comprising a second quadratic penalty, wherein the second quadratic penalty is determined as a function of the first data set and the second data set in constructing the second dependency graph; and determining an anomaly score for each of the plurality of sensors based on comparing the first dependency graph and the second dependency graph.

2. The method of claim 1, further comprising:
responsive to determining that an anomaly score associated with a sensor in the plurality of sensors meets a threshold value indicative of abnormal functioning, automatically performing a corrective action to correct equipment coupled to the sensor.

3. The method of claim 1, wherein the first object function is solved by a projected gradient algorithm.

4. The method of claim 3, wherein the projected gradient algorithm embeds an approximate Newton method, wherein feasibility with respect to sparsity constraint is handled via projection, and a symmetric positive-definiteness of iterates is ensured through a line-search procedure.

5. The method of claim 1, wherein the determining of the anomaly score for each of the plurality of sensors comprises implementing a conditional expected Kullback-Liebler divergence between the first dependency graph and the second dependency graph.

6. The method of claim 1, wherein the determining of the anomaly score for each of the plurality of sensors comprises implementing a stochastic nearest neighbors algorithm measuring dissimilarity between neighborhood of i-th variable representing a sensor between the first dependency graph and the second dependency graph.

7. The method of claim 1, wherein the determining of the anomaly score for each of the plurality of sensors comprises implementing a sparsest subgraph approximation based on the first dependency graph and the second dependency graph.

8. The method of claim 1, wherein the equipments comprise equipments of an industrial process.

9. The method of claim 1, wherein the equipments comprise equipments of a manufacturing process manufacturing a product.

10. A computer readable storage device storing a program of instructions executable by a machine to perform a method comprising:
receiving a first data set comprising sensor data detected by a plurality of sensors coupled to equipments in operation during a first period of time;
constructing a first dependency graph based on the first data set by solving a first objective function constrained with a maximum number of non-zeros and formulated with a regularization term comprising a first quadratic penalty to control sparsity, wherein the first quadratic penalty is determined as a function of the first data set in constructing the first dependency graph;
receiving a second data set comprising sensor data detected by the plurality of sensors coupled to the equipments in operation during a second period of time;
constructing a second dependency graph based on the second data set by solving the first objective function constrained with the maximum number of non-zeros and formulated with the regularization term comprising a second quadratic penalty, wherein the second quadratic penalty is determined as a function of the first data set and the second data set in constructing the second dependency graph; and
determining an anomaly score for each of the plurality of sensors based on comparing the first dependency graph and the second dependency graph.

11. The computer readable storage device of claim 10, further comprising:
responsive to determining that an anomaly score associated with a sensor in the plurality of sensors meets a threshold value indicative of abnormal functioning, automatically performing a corrective action to correct equipment coupled to the sensor.

12. The computer readable storage device of claim 10, wherein the first object function is solved by a projected gradient algorithm.

13. The computer readable storage device of claim 12, wherein the projected gradient algorithm embeds an approximate Newton method, wherein feasibility with respect to sparsity constraint is handled via projection, and a symmetric positive-definiteness of iterates is ensured through a line-search procedure.

14. The computer readable storage device of claim 10, wherein the determining of the anomaly score for each of the plurality of sensors comprises implementing a conditional expected Kullback-Liebler divergence between the first dependency graph and the second dependency graph.

15. The computer readable storage device of claim 10, wherein the determining of the anomaly score for each of the plurality of sensors comprises implementing a stochastic nearest neighbors algorithm measuring dissimilarity between neighborhood of i-th variable representing a sensor between the first dependency graph and the second dependency graph.

16. The computer readable storage device of claim 10, wherein the determining of the anomaly score for each of the plurality of sensors comprises implementing a sparsest subgraph approximation based on the first dependency graph and the second dependency graph.

17. A system, comprising:
a hardware processor coupled with a communication interface;
a memory device coupled to the hardware processor;
the hardware processor operable to receive via the communication interface, a first data set comprising sensor data detected by a plurality of sensors coupled to equipments in operation during a first period of time;
the hardware processor operable to construct a first dependency graph based on the first data set by solving a first objective function constrained with a maximum number of non-zeros and formulated with a regularization term comprising a first quadratic penalty to control sparsity, wherein the first quadratic penalty is determined as a function of the first data set in constructing the first dependency graph;
the hardware processor operable to receive a second data set comprising sensor data detected by the plurality of sensors coupled to the equipments in operation during a second period of time;
the hardware processor operable to construct a second dependency graph based on the second data set by solving the first objective function constrained with the maximum number of non-zeros and formulated with the regularization term comprising a second quadratic penalty, wherein the second quadratic penalty is determined as a function of the first data set and the second data set in constructing the second dependency graph; and the hardware processor operable to determine an anomaly score for each of the plurality of sensors based on comparing the first dependency graph and the second dependency graph.

18. The system of claim 17, wherein the hardware processor is further operable to, responsive to determining that an anomaly score associated with a sensor in the plurality of sensors meets a threshold value indicative of abnormal functioning, automatically trigger a corrective action to correct an equipment coupled to the sensor.

19. The system of claim 17, wherein the first object function is solved by a projected gradient algorithm.

20. The system of claim 19, wherein the projected gradient algorithm embeds an approximate Newton method, wherein feasibility with respect to sparsity constraint is handled via projection, and a symmetric positive-definiteness of iterates is ensured through a line-search procedure.

* * * * *